United States Patent [19]

Holmes

[11] E Re. 31,169

[45] Reissued Mar. 8, 1983

[54] SORTING SYSTEM AND APPARATUS

[75] Inventor: Robert G. Holmes, Columbus, Ohio

[73] Assignee: Ohio Agricultural Research & Development Center, Wooster, Ohio

[21] Appl. No.: 156,600

[22] Filed: Jun. 5, 1980

Related U.S. Patent Documents

Reissue of:

[64] Patent No.: 4,116,339
Issued: Sep. 26, 1978
Appl. No.: 778,794
Filed: Mar. 17, 1977

[51] Int. Cl.[3] ..... B07C 1/00

[52] U.S. Cl. ..... 209/699; 209/931; 209/640

[58] Field of Search ..... 209/699, 910, 933, 638, 209/637, 640, 641, 642; 198/752, 771

[56] References Cited

U.S. PATENT DOCUMENTS

| | | | |
|---|---|---|---|
| 19,151 | 1/1958 | Perham . | |
| Re. 26,291 | 10/1967 | Carrier, Jr. | 198/771 |
| 731,828 | 6/1903 | White | 209/699 |
| 1,299,278 | 4/1919 | Woolner et al. . | |
| 1,339,077 | 5/1920 | Trufant . | |
| 1,690,171 | 11/1928 | Kmentt . | |
| 1,849,055 | 3/1932 | Cropper . | |
| 2,128,848 | 8/1938 | Rafetto . | |
| 2,277,037 | 1/1940 | Clark et al. . | |
| 2,591,868 | 4/1952 | Puster et al. . | |
| 3,004,662 | 10/1961 | Armstrong et al. . | |
| 3,559,805 | 2/1971 | Cragg . | |
| 3,680,694 | 8/1972 | Hamman | 209/119 |
| 3,788,466 | 1/1974 | Wilson et al. . | |
| 3,805,953 | 4/1974 | Jones et al. . | |

OTHER PUBLICATIONS

Hamann, D. D., L. J. Dushman, and W. E. Ballinger (1973), Sorting Blueberries for Quality by Vibration, *Journal of the American Society for Horticultural Science,* vol. 98, No. 6, pp. 572–576, Nov. 1973.

Stephenson, K. Q., R. K. Byler, and M. A. Wittman, (1973), Vibrational Response Properties as Sorting Criteria for Tomatoes, Transactions of ASAE, 16:258, Mar. 1973.

Kattan, A. A., C. Q. Sharp, and J. R. Morris, (1969), A Mechanical Sorter for Tomatoes, *Arkansas Farm Research,* vol. XVIII, No. 1, p. 8, Jan.–Feb. 1969.

Heron, J. R. and G. L. Zacharia, (1974), Automatic Sorting of Processing Tomatoes, *Transactions of ASAE,* 55:987.

Stephenson, K. Q. (1964), Selective Fruit Separation for Mechanical Tomato Harvester, Agricultural Engineering, 45:250–253.

Hamann, Donald D. and Daniel E. Carroll, (1971), Ripeness Sorting of Muscadine Grapes by Use of Low-Frequency Vibrational Energy, *Journal of Food Science,* 36:1049.

Wright, Paul L., (1972), The Latest on Machine Harvesting of Processing Tomatoes in Ohio, unpublished paper, Agricultural Extension Service, Fremont, Ohio.

Kattan, A. A., R. H. Benedict, G. A. Albritton, H. F. Osborne, and C. Q. Sharp, (1968), Mass Grading Machine-Harvested Tomatoes, *Arkansas Farm Research,* vol. XVIII, No. 1, Jan.–Feb. 1968, p. 5.

Gould, W. A., "Mass Sorting of Mechanically Harvested Tomatoes", Research Circular 209, Dec., 1975, Ohio Agricultural Research and Development Center, Wooster, Ohio.

Harbage, R. P., T. H. Short, and Dale W. Kretchman, (1972), Considerations for Mechanising Processing Tomato Production in Ohio, Agricultural Engineering Series 12, Ohio Agricultural Research and Development Center, Wooster, Ohio.

Stephenson, K. Q., (1974), Color Sorting System for Tomato, *Transactions of ASAE,* 55:1185.

Johnson, Paul E., (1973), Tomato Harvesters for the Midwest, Unpublished paper, Agricultural Extension Service, Purdue University.

*Primary Examiner*—Allen N. Knowles
*Attorney, Agent, or Firm*—Millard & Cox

[57] ABSTRACT

Method, apparatus and system for sorting objects exhibiting identifiable dynamic response to vibrational phenomena, such objects including tomatoes and other comestibles. The system utilizes an elongate sorting zone incorporating a surface which oscillates at a predetermined frequency and amplitude which varies from a minimum at the input of the zone to a maximum value at the output thereof. Conveyor belts transport the objects to be sorted along the zone for a coding interval promoting their dynamic reaction with the oscillatory surface. Objects with higher resilience characteristic are rejected from the zone, while those exhibiting a lesser resilience are transported therethrough. The oscillatory surface is dynamically balanced and readily mounted upon field harvesting devices. By adjustment of frequency of the sorting zone oscillatory surfaces, a multistage sorting system is made available.

51 Claims, 15 Drawing Figures

FIG. 4
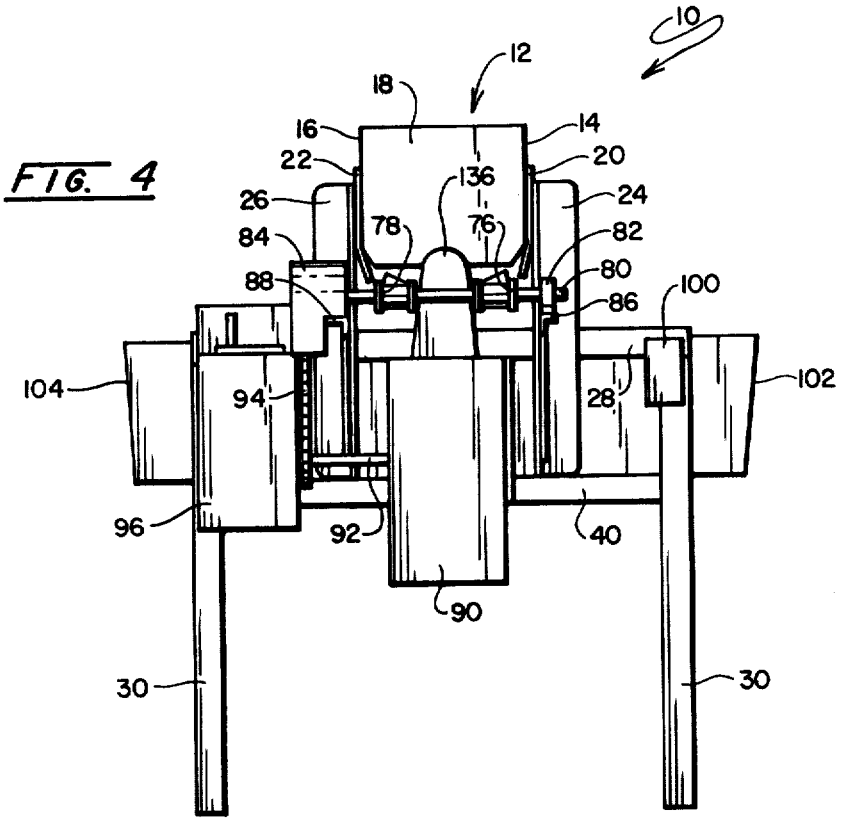
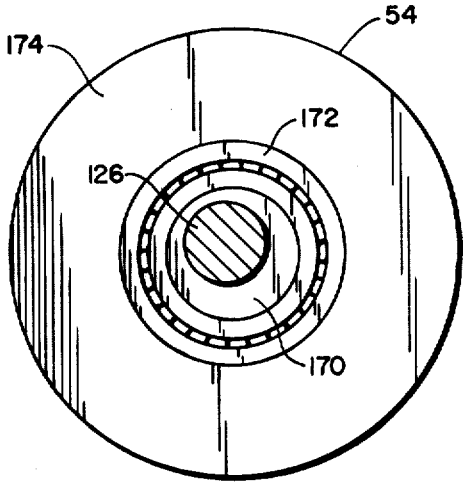
FIG. 5

FIG. 7
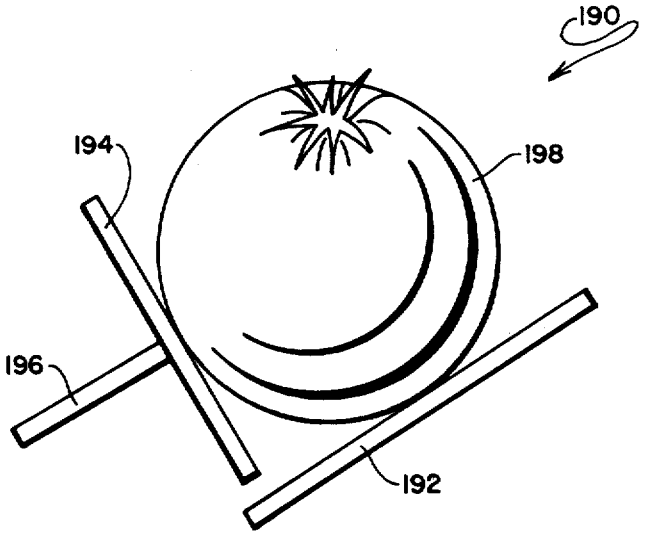
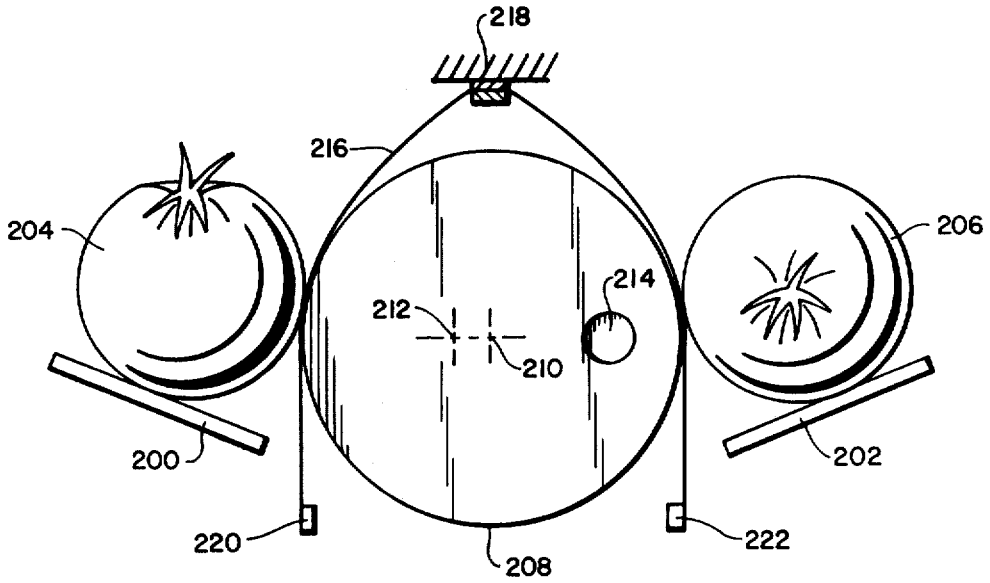
FIG. 8

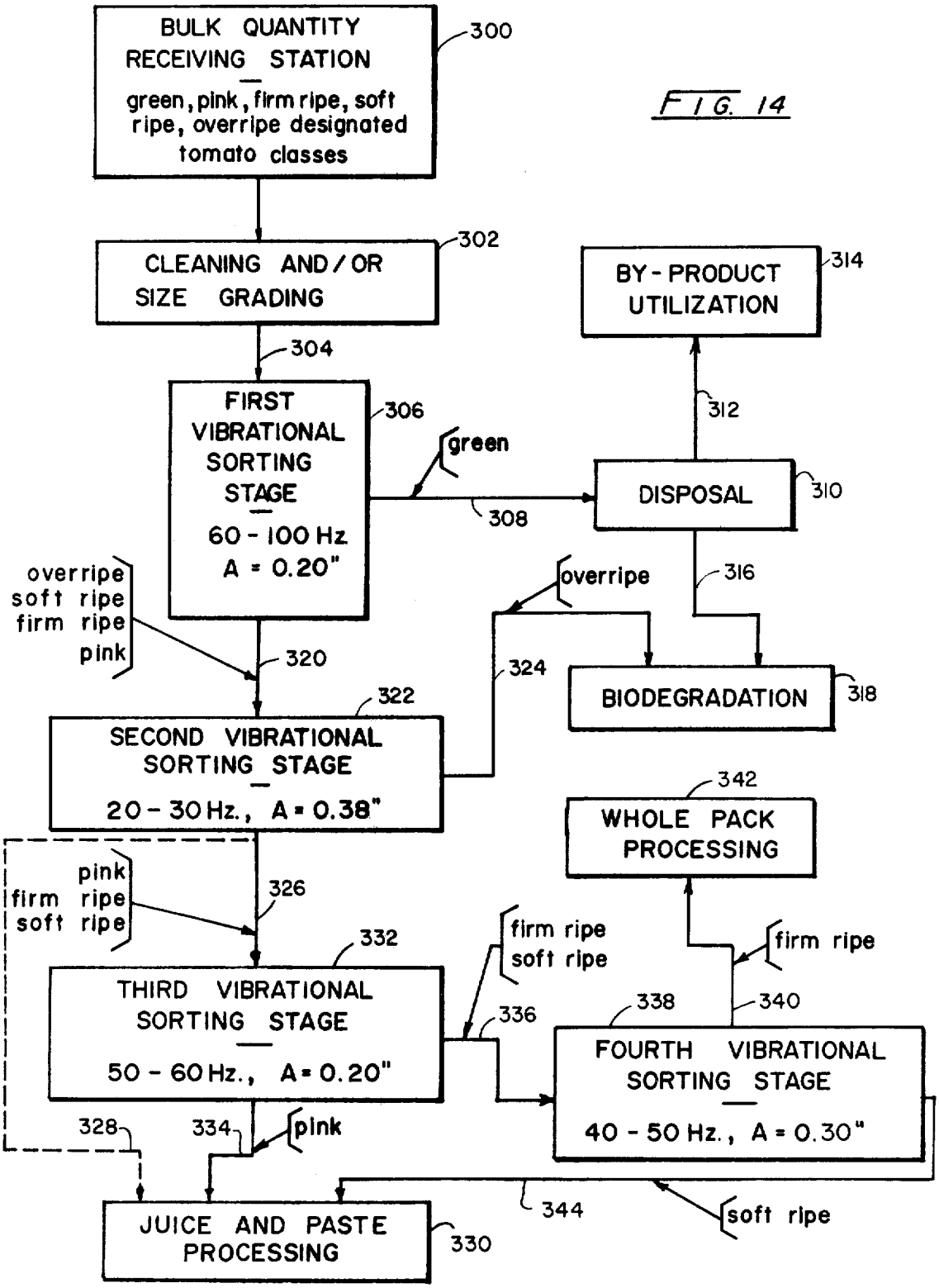
BULK QUANTITY RECEIVING STATION
green, pink, firm ripe, soft ripe, overripe designated tomato classes
300
FIG. 14
CLEANING AND/OR SIZE GRADING
302
BY-PRODUCT UTILIZATION
314
304
FIRST VIBRATIONAL SORTING STAGE
60 - 100 Hz
A = 0.20"
306
green
308
DISPOSAL
310
312
overripe
soft ripe
firm ripe
pink
320
overripe
316
324
BIODEGRADATION
318
322
SECOND VIBRATIONAL SORTING STAGE
20 - 30 Hz., A = 0.38"
342
WHOLE PACK PROCESSING
pink
firm ripe
soft ripe
326
332
firm ripe
soft ripe
firm ripe
THIRD VIBRATIONAL SORTING STAGE
50 - 60 Hz., A = 0.20"
336
338
340
FOURTH VIBRATIONAL SORTING STAGE
40 - 50 Hz., A = 0.30"
328
334
pink
344
soft ripe
JUICE AND PASTE PROCESSING
330

SORTING SYSTEM AND APPARATUS

Matter enclosed in heavy brackets [ ] appears in the original patent but forms no part of this reissue specification; matter printed in italics indicates the additions made by reissue.

BACKGROUND

This invention is concerned with coding related sorting systems, methods and apparatus particularly useful in the agricultural industry. The sorting of agricultural commodities during or shortly following the time of their harvest has assumed increasing importance as an aspect in achieving both production economies and higher quality processing and packaging prior to the introduction of the commodities into the consumer market. Concerning the utilization of coding and sorting systems in conjunction with harvesting the development of economical and efficient field sorting techniques for several agricultural commodities would be of considerable value to the industry. As one example, potatoes, by virtue of the soil conditions extant in the regions of their cultivation, are removed from the ground in conjunction with rocks, clods and the like which ultimately must be separated from the harvested material bulk. Where such removal or sorting procedures are carried out at processing or collection stations removed from the locale of the producing fields, higher expenditures are necessitated for hauling the greater weight in bulk of the harvest. Conversely, where rock materials and the like can be removed at the site of the harvest, disposal problems associated with the waste are minimized and the cost of transporting the harvested product to collection regions or stations is considerably lower. Commercially grown onions represent another of such commodities, which when harvested, necessarily are collected with dirt clods and the like often representing 50% of the bulk of the harvested material. Where such bulk is transported to receiving stations prior to segregation of the commodity from the waste, a considerable expenditure for transportation and the like is incurred. By separating the dirt clods early or in conjunction with the harvesting procedure itself, convenience and economy readily are recognized.

Perhaps one of the more complex harvesting techniques is associated with the tomato. Currently, about 300,000 acres in California and a smaller but significant number in the midwest are devoted to the production of processing tomatoes. Substantially all of the California acreage is machine harvested, while about 10% of the acreage in the midwestern locale is so harvested. Presently grown tomato cultivars ripen non-uniformly and, as a consequence, they either must be harvested by hand as they ripen, or, if practical, once-over mechanical harvesters are employed, the tomatoes all being harvested at one time and the resultant harvest providing a bulk quantity thereof which must subsequently be sorted to remove green or immature fruit. Particularly in consequence of labor related economic factors, the industry has looked with favor toward harvesting procedures of the once-over variety wherein the vines are uprooted, all tomatoes removed therefrom and transported to collection stations for packing house processing. Where field sorting of the tomatoes in accordance with their degree of ripeness is provided, such provision generally is made through the utilization in the field of about ten to twenty-five laborers who ride upon the harvester to carry out visual coding and sorting. The consequent labor expense as well as the significant increase in machine size and weight have been found to impose severe limitations on the effectiveness of the mechanical harvesting system. Size and weight are particularly complicating factors where the harvesters are utilized in wet or soggy fields, an environmental condition very often encountered in the midwestern regions. For a more detailed discussion of the latter problems, reference is made to the following publication:

I. Harbage, R. P., T. H. Short, and Dale W. Kretchman, (1972). Considerations for Mechanizing Processing Tomato Productions in Ohio. Agricultural Engineering Series 12, Ohio Agricultural Research and Development Center, Wooster, Ohio.

Where the extent of acreage involved in a given harvesting region is sufficiently large, more expensive machinery incorporating complete sorting systems becomes more practical, however, particularly in midwestern regions and the like, such cost considerations generally have precluded the utilization of harvesting systems incorporating automatic sorting devices. However, the need remains for a practical embodiment of a harvester mounted sorting system inasmuch as typical tomato cultivars do not ripen uniformly. Consequently, once-over harvesting procedures necessitate the collection of tomatoes of a broad variety of maturities including immature fruits, the value of which is considered dismissable. This situation is particularly prevalent in the midwest where mechanial harvesting commences when about 30% or more of the fruit is green or immature. Additionally, rainfall during harvesting periods is generally found to be higher in the midwest than in other regions, thus treating wet ground conditions which, as noted above hinder movement of the harvesters in the field. This climate also asserts greater variation in the maturity range of a harvested crop. Further information concerning such harvesting aspects may be found in Publication I and the following publication:

II. Stephenson, K. Q. (1974). Color Sorting System for Tomatoes. Transactions of ASAE, 55: 1185.

Several varieties of tomato harvesters are currently produced, the capacity for more current models being in the range of about thirty tons of fruit per hour. Where manual sorting is incorporated with the machine, such capacities are considerably limited. Human sorting has been found to average about one-half ton per hour on a per capita designated basis. As is apparent, some other form of sorting is required to improve sorting capacities. For further discussion concerning the above harvesting considerations, reference is made to Publication I and the following publications:

III. Johnson, Paul E. (1973). Tomato Harvesters for the Midwest. Unpublished paper. Agricultural Extension Service, Purdue University.

IV. Wright, Paul L. (1972). The Latest on Machine Harvesting of Processing Tomatoes in Ohio. Unpublished paper, Agricultural Extension Service, Fremont, Ohio.

In view of the significant quantity of machine picked tomatoes which are immature or green, and which have no significantly discernable value, a considerable advantage would accrue with the utilization of an economic field harvesting scheme automatically disposing of such tomatoes in the field site for natural biodegradation. Without such sorting, all harvested tomatoes are required to be hauled to the processing plant for sorting purposes, a requirement which levies higher costs upon the harvesting procedure.

Looking now to in plant sorting techniques, typical sorting systems involve a non-destructive coding followed by a segregation technique sometimes referred to as "switching". While most industrial sorting procedures for comestibles are carried out by labor utilizing both the visual as well as tactile senses, investigations have been conducted into techniques for reducing the labor intensity of such procedures. For example, with respect to tomatoes, the specific gravity thereof has been found to increase with ripeness and has been suggested as a sorting technique. In one such arrangement, a gravity sorting system is provided wherein tomatoes are floated in solutions of ethanol and water. Typically 80 to 90 percent of the green tomatoes and 15 to 25 percent of lower quality acceptable tomatoes will float. In another such arrangement, a low percentage brine solution has been utilized in an arrangement wherein the rate of upward floatation movement of tomatoes served as the coding procedure. For further information concerning such coding and sorting techniques reference is made to the following publications:

V. Kattan, A. A., R. H. Benedict, G. A. Albritton, H. F. Osborne, and C. Q. Sharp. (1968). Mass Grading Machine-Harvested Tomatoes. Arkansas Farm Research, Vol. XVIII, No. 1, January–February, 1968, p. 5.

VI. Kattan, A. A., C. Q. Sharp, and J. R. Morris. (1969). A Mechanical Sorter for Tomatoes. Arkansas Farm Research, Vol. XVIII, No. 1, p. 8, January–February, 1969.*

See also: Gould, W. A. "Mass Sorting of Mechanically Harvested Tomatoes." Research Circular 209, December, 1975. Ohio Agricultural Research and Development Center, Wooster, Ohio.

Sorting concepts for tomatoes based upon the light reflectance properties thereof have been proposed or developed as apparatus, for instance, electronic color sorters wherein light reflecting from the fruit is sensed by a photoresponsive device. Utilizing appropriate coding or selecting circuitry, a form of switching then is incorporated with the sorting system such as an air blast or plunger providing an ejection function. These systems are available only at such relatively higher costs as are considered above the level of practicality for plant or field installations of smaller extent. For field harvesting adaptation, the electronic or light reflectance systems are called upon to operate under somewhat rigorous and dirty field conditions. Accordingly, maintenance costs of considerable extent necessarily are encountered in addition to a relatively high initial capital investment. Further elaboration upon this form of sorting for tomatoes is provided, for example, in Publication II and in the following publications:

VII. Heron, J. R. and G. L. Zachariah. (1974) Automatic Sorting of Processing Tomatoes. Transactions of ASAE, 55:987.

VIII. Stephenson, K. Q. (1964). Selective Fruit Separation for Mechanical Tomato Harvester. Agricultural Engineering, 45:250–253, May, 1964.

IX. Stephenson, K. Q. (1966). Automatic Sorting System for Tomato Harvesters. Procedures of NationalConference on Mechanization of Tomato Production, Purdue University, Lafayette, Indiana. 1966.

Investigations also have been conducted into the response of tomatoes and other fruits to vibrational phenomena. For example, a downwardly inclined trough mechanically excited by an electrodynamic shaker utilized for the purpose of separating grapes into ripeness categories has been described in U.S. Pat. No. 3,680,694 as well as in the following publication:

X. Hamann, Donald D. and Daniel E. Carroll. (1971). Ripeness Sorting of Muscadine Grapes by Use of Low-Frequency Vibrational Energy. Journal of Food Science, 36: 1049.

This same approach has been used in similar attempts to sort blueberries as described in the following publication:

XI. Hamann, D. D., L. J. Kushman, and W. E. Ballinger. (1973). Sorting Blueberries for Quality by Vibration. Journal of the American Society for Horticultural Science. Vol. 98, No. 6, p. 572–576, Nov., 1973.

The above studies generally recognize that vibrational sorting is based upon differences in resiliency of the object subjected to such vibration and that correlations are available between fruit or vegetable ripeness and this exhibited resiliency. The response of tomatoes to vibration as a potential criterion for sorting has been studied. For instance, the resonant frequencies of tomatoes of various maturities has been investigated, the response of a green tomato so excited being found to be approximately six times that of a ripe tomato. A more detailed discourse concerning this subject is provided in the following publication:

XII. Stephenson, K. Q., R. K. Byler, and M. A. Wittman. (1973). Vibrational Response Properties as Sorting Criteria for Tomatoes. Transactions Of ASAE, 16:258, March, 1973.

To the present time, sorters operating upon vibrational principles have been found to be somewhat impractical, their capacities for field harvesting applications being considered too low for the volumes of sorting usually required, and the mechanisms generating required vibration being both expensive and difficult to use at requisite frequencies.

SUMMARY

The present invention is addressed to a system, method and apparatus for sorting objects exhibiting a classifiably dynamic response to vibrational phenomena. Incorporating an oscillatory surface to provide coding performance, the apparatus of the invention remains dynamically balanced while providing a capability for sorting high volumes of such comestibles as tomatoes. This high volume sorting capacity is achieved while still retaining a practicality in size and operation commensurate with an incorporation thereof within mechanical field harvesters and the like.

The invention enjoys a capability for accommodating to the sorting of a variety of comestibles as well as to various ranges of maturities of such fruits as tomatoes. Similarly, the system readily is adapted to the sorting of fruit having been subjected to freezing conditions and the like, void content phenomena in such vegatable as potatoes and bloat conditions encountered in the processing of cucumbers for pickles and the like. Additionally, the system may be incorporated in the field harvesting of a broad variety of commodities including the earlier noted onions and potatoes as well as tomatoes. The statistical reliability of sorting achieved with the invention is enhanced through its capability for relatively simple field tuning, achieved through the expedient of frequency adjustment over the oscillatory surface utilized within the sorting zone of the system.

Another aspect and object of the invention is to provide an apparatus for carrying out the noted sorting procedures which includes an arrangement for introducing a quantity of the objects to be sorted at the entrance location of a sorting zone which extends along a given longitudinal axis. An oscillatory surface is located within the zone along its axis and is driven by a dynamically balanced rotative drive member to impart an oscillation or vibration of a predetermined frequency and amplitude characteristic to the coding or oscillatory surface. A transporter arrangement including a conveyer surface extends along the zone adjacent and parallel to the noted longitudinal axis and serves to sequentially move objects within the zone in orientations promoting their kinetic reaction with the oscillatory surface. Accordingly, each of the objects sorted is contactable with this surface for a relatively extended coding interval to assure the occasion of a reaction with a portion of the surface of the object exhibiting the resilliancy characteristics for which sorting is established. In a preferred arrangement of the invention, the oscillation of the vibrational surface is carried out at amplitudes of oscillation progressively increasing in value from the point of introduction of the objects to the zone toward the output region thereof. For sorting tomatoes, this amplitude varies, for example, between about 0 and 0.40 inch and is carried out by frequencies ranging between about 20 and 100 Hertz.

Another feature and object of the invention is to provide a sorting apparatus of the type described wherein the drive arrangement thereof includes a drive member which is present as an elongate shaft extending along the longitudinal axis of the sorting zone from a first terminus, located in the vicinity of the entrance location of the zone, to a second terminus, positioned in the region of the output of the zone. A bearing arrangement for supporting the elongate shaft at least in the vicinity of the first and second termini is provided to achieve a symmetrical and balanced rotation of the shaft about the longitudinal axis of the zone. A bearing surface is situated upon the shaft intermediate the noted termini and is movable in driven relationship with the shaft but has an axis of rotation eccentric with respect to the longitudinal axis of the zone. The structure of the oscillating surface includes a supporting component which is arranged in driven relationship with the bearing surface of eccentric orientation upon the shaft. This surface additionally is flexibly restrained such that it is fixed against rotation in and of itself while being permitted to ocillate by virtue of its connection with the noted supporting component. Counterweights are associated with the drive shaft to assure dynamic balance of the system and, with the arrangement, a form of oscillation motion is imparted to the surface such that any point thereupon moves to define a circular locus of motion. The diameter of that locus is equivalent to the amplitude of oscillation for a given selected point of the surface. Frequency adjustment is readily provided through variation of the speed of rotation of the drive shaft of the apparatus. The objects to be sorted, for example, tomatoes, are moved in single file fashion along conveyer belts positioned adjacent the oscillating surface. Those objects or tomatoes exhibiting a higher resilience, which is predetermined in accordance with maturity or other considerations, dynamically react to contact with the oscillative surface by ejective movement transverse to the longitudinal axis of the zone and are received or disposed of as desired. Conversely, those objects having a lower predetermined resiliency characteristic are not moved from the transporter arrangement by virtue of their contact with the oscillatory surface and are transported through the zone to exit therefrom at the output end or second terminus thereof.

Another feature and object of the invention is to provide a sorting apparatus of the type described wherein the drive arrangement includes a rotative drive member extending substantially between a first terminus at the vicinity of the entrance location of the sorting zone and a second terminus in the vicinity of the end of the zone opposite the entrance location. This drive member is mounted for eccentric rotation about the longitudinal axis of the zone, preferably in an arrangement wherein its amplitude of eccentric movement increases from the first toward the second terminus providing bearing support. The member is formed to rotate in dynamically balanced fashion through such expediants as providing offset bores therein. The oscillatory surface of the instant embodiment of the invention is provided as a thin flexible, sheet-like member positioned in mutually contacting adjacency over the rotative member. The sheet-like member is fixed against rotation with the rotative member but oscillates in response to the rotative actuation thereof. Improved performance for the sheet-like member preferably is provided by linear weights connected therewith in a manner providing for the urging of the sheet into mutual contacting adjacency with the eccentrically rotative drive member.

Another object of the invention is to provide a method of sorting a quantity of discrete objects exhibiting classifiable dynamic response to vibrational phenomena which includes the steps of introducing a quantity of the objects in sequential single file fashion upon a narrow conveyer surface moving in a given direction through the sorting zone. Simultaneously with the transporting of the objects through the zone, a kinetic reaction of the objects by contact thereof with an oscillatory surface disposed along the zone is promoted, this surface oscillating at a predetermined frequency and at amplitudes which increase in value along the zone between its input and output. The objects dynamically reacting to contact with this surface by ejective movement transverse to the direction of their transportation are received and represent one category of classification. Similarly, those objects of another classification for sorting which are transported through the zone to exit from its output are received for use in accordance with their designated classification.

A further object of the invention is to provide a system for sorting bulk quantities of tomatoes which may contain maturity classes of tomatoes including green, pink, firm ripe, soft ripe and overripe designated ones. The system incorporates a means for receiving this bulk quantity of tomatoes, from which the tomatoes are directed into a first vibrational sorting stage wherein the tomatoes are transported in contacting relationship with a surface oscillating at a frequency selected between about 60 to 100 Hertz and at a maximum amplitude selected within a range of about 0.20 to 0.25 inch. This first stage vibrationally ejects green designated tomatoes while transporting pink, overripe, firm ripe and soft ripe designated ones therethrough. The latter designated tomatoes are introduced to a second vibrational sorting stage through which they are transported in contacting relationship with a surface oscillating at a frequency selected between about 25 to 30 Hertz and at a maximum amplitude selected at about 0.38 inch to effect a vibrational ejection of pink, firm ripe and soft ripe designated tomatoes while transporting overripe designated tomatoes therethrough. Additionally, an arrangement for receiving the ejected pink, firm ripe and soft ripe designated tomatoes is provided whereupon they are utilized for processing to provide juice and paste-type products.

The system further may be elaborated upon with the addition of a third vibrational sorting stage which receives the tomatoes transported through the second stage and which transports these received tomatoes through a sorting zone in contacting relationship with a surface oscillating at a frequency selected between about 50 to 60 Hertz and at a maximum amplitude of about 0.20 inch to vibrationally eject pink designated tomatoes while transporting firm ripe and soft ripe designated ones therethrough. The latter tomatoes are introduced into a fourth vibrational stage and transported within a corresponding fourth sorting zone in contacting relationship with a surface oscillating at a frequency selected between about 40 to 50 Hertz and at a maximum amplitude of about 0.30 inch to vibrationally eject firm ripe designated tomatoes while transporting soft ripe designated tomatoes through the zone. A receiving arrangement is provided which collects the pink and soft ripe designated tomatoes for processing as juice, paste or the like while a second receiving arrangement is provided for collecting the firm ripe designated tomatoes which may be utilized for whole pack processing procedures.

Other objects of the invention will, in part, be obvious and will, in part, appear hereinafter.

The invention, accordingly, comprises the system, method and apparatus possessing the construction, combination of elements, arrangement of parts and steps as are exemplified in the following detailed disclosure. For a fuller understanding of the nature and objects of the invention, reference should be had to the following detailed description taken in connection with the accompanying drawings.

BRIEF DESCRIPTION OF THE DRAWINGS

FIG. 4 is an end view of the apparatus of FIG. 1;

FIG. 5 is a sectional view of the oscillatory surface configuration of the apparatus of FIG. 1;

FIG. 7 is a schematic representation of a vibratory test device utilized in generating technical data described herein;

FIG. 8 is a schematic representation of another oscillatory surface and drive embodiment of the invention;

FIG. 14 is a block schematic processing flow diagram showing a system for carrying out the in plant sorting of tomatoes of four classes of maturity.

DETAILED DESCRIPTION

Figure 1:
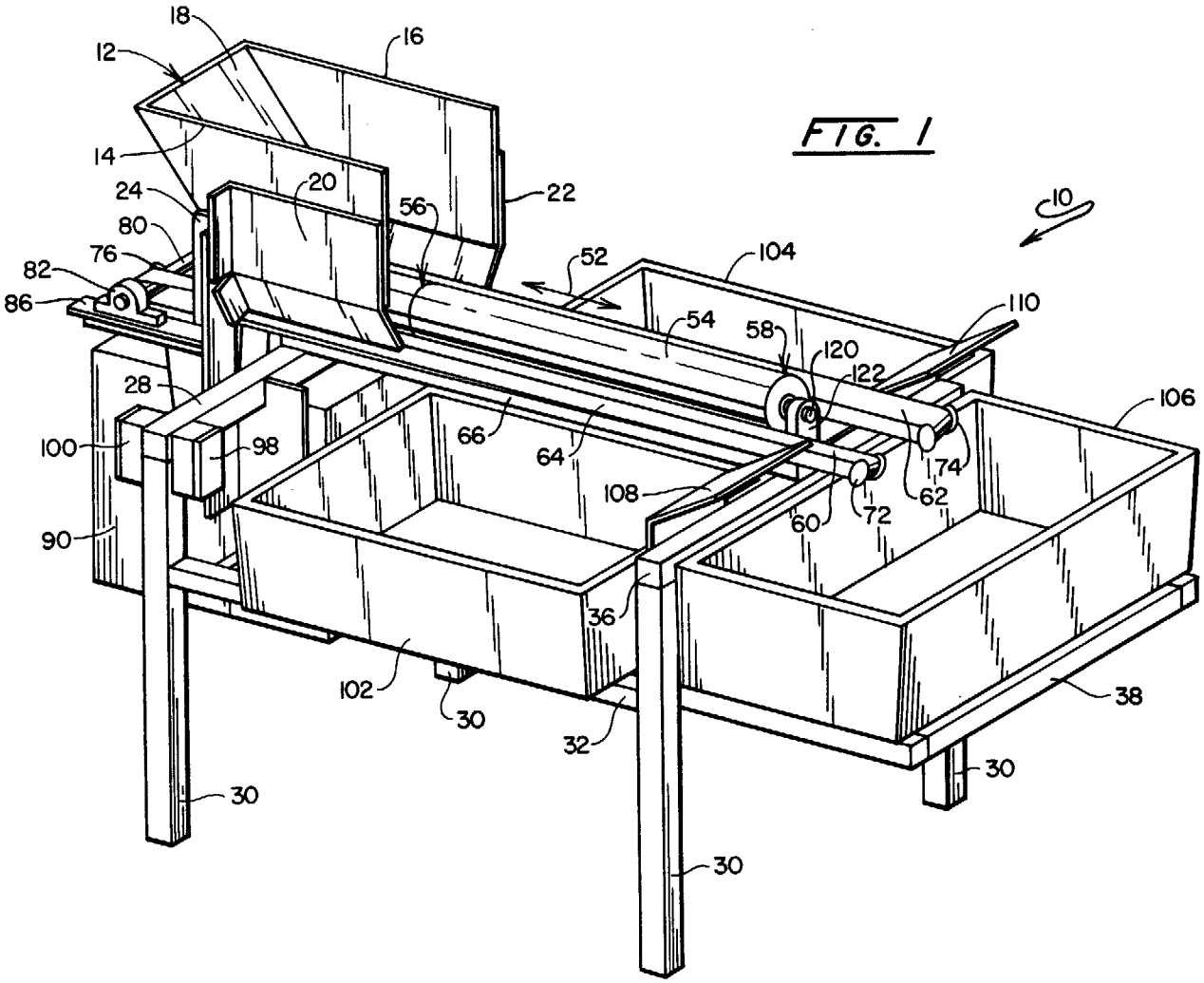
FIG. 1 is a perspective representation of a preferred embodiment for tomato sorting apparatus according to the invention.

The principal embodiment for the present invention is concerned with a practical system for the sorting of tomatoes according to maturity. This sorting is carried out on the basis of what may be described as the characteristic resiliencies established by tomato cultivars during various stages of ripening or maturity. Such resiliencies in turn, generally may be considered as ratios of effective spring constant to internal damping. As a prelude to considering the actual technique of the invention utilized to achieve statistically reliable sorting, a cursory observation of the morphology and physiology of this fruit, belonging to the genus and species Lycopersicon esculentum, may be of value. The tomato fruit generally comprises a fleshy pericarp disposed about an outer periphery which is covered by a thin skin and which surrounds a number of locules. These locules are cavities which are separated by fleshy cross-walls of about the same thickness as the pericarp and contain seeds attached to a placenta. The number of locules disposed within the tomato generally varies with the cultivar. For further discussion, reference is made to the following publication:

XIII. Wilson, C. L., W. E. Loomis, and T. A. Steeves. (1971). Botany. 5th ed. New York: Holt, Rinehart and Winston, Inc. 1971.

The physiology of tomato fruit formation generally is considered to involve three phases: fruit development; ripening; and senescence. As the tomato reaches its approximate maximum size, it is considered to be mature and is green in color due to its chlorophyll content and exhibits a "hardness". This state of maturity must be achieved before natural ripening occurs. As the tomato begins to change color toward red there is a marked increase in the respiration rate thereof, a phenomenon referred to as the climacteric rise. This respiration rate reaches a maximum value, referred to as the climacteric, whereupon the rate commences to decline. The tomato may be considered ripe shortly after achieving climacteric, and this ripening commences from the inside thereof and progresses toward the outside. Ripening is accompanied by a change in color from green to red as well as changes in firmness in consequence of pectic substance alteration and in flavor producing alterations in aromatic organic compounds making up the fruit. Each of these aspects of maturation represents an important aspect in the requisite sorting of the tomatoes for purposes of industrial processing. With regard to these processes, color change of the tomatoes in the course of the ripening occurs in a sequence commencing with green, followed by an alteration therefrom towards white and thereafter towards red or orange depending upon the environmental temperature. The softening of tomatoes during the ripening process is considered to be due largely to the conversion of protopectin and calcium pectate in the middle lamellae and primary cell walls of the pericarp to soluble pectins. For further discourse concerning this process, reference is made to the following publications:

XIV. Goss, James A. (1973). Physiology of Plants and Their Cells. New York: Pergammon Press Inc., 1973.

XV. Khudairi, A. Karim. (1972). The Ripening of Tomatoes. American Scientist, Volume 60, p. 696, November-December, 1972.

XVI. Gruelach, Victor A. (1973). Plant Function and Structure, New York: The MacMillan Company, 1973.

XVII. Mohr, W. P. and M. Stein. (1969). Fine Structure of Fruit Development in Tomato. Canadian Journal of Plant Science, Volume 49, No. 5, p. 549-553, September, 1969.

As is described in the following publication:

XVIII. Gould, Wilbur A. (1975). A Preliminary Report on Mass Sorting of Mechanically Harvested Tomatoes. Horticultural Dept. Series 417, Dept. of Horticulture, Ohio Agricultural Research and Development Center, Wooster, Ohio. January, 1975.

the grading of tomatoes by color has been the subject of investigation, and as a consequence, a variety of grading systems have been brought into use. For example, (a) The U.S. grade standards established in 1933; (b) a dual grade based upon wave length utilized in California; (c) a four grade designation developed by the Ohio Agricultural Experiment Station in 1952; and (d) a USDA system utilizing a tomato colorimeter to provide a four-way classification to subjectively evaluate defects.

As noted above, firmness also is an important attribute for the grading of tomatoes for processing and a variety of studies have been conducted in connection with this aspect. The tomato fruit is a viscoelastic biological material and, accordingly, its mechanical properties are not readily defined with consistency. Further, as may be expected, the mechanical properties of the tomato vary with the variety thereof as well as the location upon the surface thereof at which firmness is tested. Investigators have reported that at least three internal factors affect firmness, to wit, rigidity of the cell wall, stiffness of the intercellular bonding agents and turgidity (turgor pressure) within the cells of the fruit. Generally, three basic measurements have been utilized to determine static or quasi-static firmness, these being (a) the force to achieve a given deformation within the product; (b) the deformation occuring under a standard force; and (c) the force-deformation ratio within the material during mechanical loading. For further discussion in connection with these aspects, reference is made to the following publications:

XX. Finney, Essex E., Jr. (1969). To Define Texture in Fruits and Vegetables. Agricultural Engineering, 50: 462-465, August 1969.

XXI. Hamson, A. R. (1952). Measuring Firmness in a Breeding Program. Procedures of the American Society for Horticultural Science 60: 425-433.

XXII. Kattan, A. A. (1957). Changes in Color and Firmness During Ripening of Detached Tomatoes, and the Use of a New Instrument for Measuring Firmness. Procedures of American Society for Horticultural Science, 70: 379-384.

For the purposes of the instant invention it has been determined that for optimum industrial processing, the harvested tomatoes, as delivered in bulk to a processing station, will incorporate green, pink, soft ripe, firm ripe, and overripe tomatoes. Essentially, only the firm ripe designated tomatoes are utilized for whole pack processing, while the soft ripe and pink are incorporated in paste and juice type processed foods.

In connection with the above, the term "pink" is intended to mean a tomato which has approached a white or red coloration but still retains regions of green coloring such that it would be unacceptable for use in whole pack processing. These tomatoes are relatively firm, however, and are readily utilized in the production of juices and paste.

The term "ripe" in connection with the modifiers "firm" and "soft" is intended to mean a tomato which is fully red in color and the modifiers have the obvious meaning.

Overripe tomatoes may be considered as rotten and are not used and, for the most part, green tomatoes also find little use for industrial food processing. Only a dismissable portion of such green tomatoes are utilized for relish manufacture and like by-products. For field harvesting purposes wherein a sorter is combined with a fully mechanized harvester, the green designated tomatoes only are rejected and usually disposed of directly upon the field from which they were picked.

Turning now to the mechanical implementation of a sorting arrangement in accordance with the invention, reference is made to FIGS. 1-4, wherein a preferred sorter apparatus is revealed generally at 10. Sorter 10 includes an entrance hopper assembly 12 including side walls 14 and 16 and an end wall 18. Walls 14 and 16, respectively, are coupled to metal brackets 20 and 22, the lowermost portions of which are bent mutually inwardly to provide a directory arrangement for tomatoes deposited within the hopper assembly 12. Brackets 20 and 22, in turn, are connected, as by bolting or welding, to respective upstanding angle supports 24 and 26, which in turn, are fixed to an upper horizontal support 28 serving as one component of a supporting frame assembly. Concerning the latter assembly, apparatus 10 is supported at any convenient elevation by four leg members as at 30 and includes two lower horizontal supports 32 and 34 (FIG. 2), as well as horizontally oriented upper transverse support 36 extending between forwardly disposed leg members 30. A lower horizontal support 38 extends between lower, longitudinally oriented horizontal supports 32 and 34. Additionally, a transverse support 40 is provided rearwardly of the frame as revealed in FIG. 4.

Figure 2:
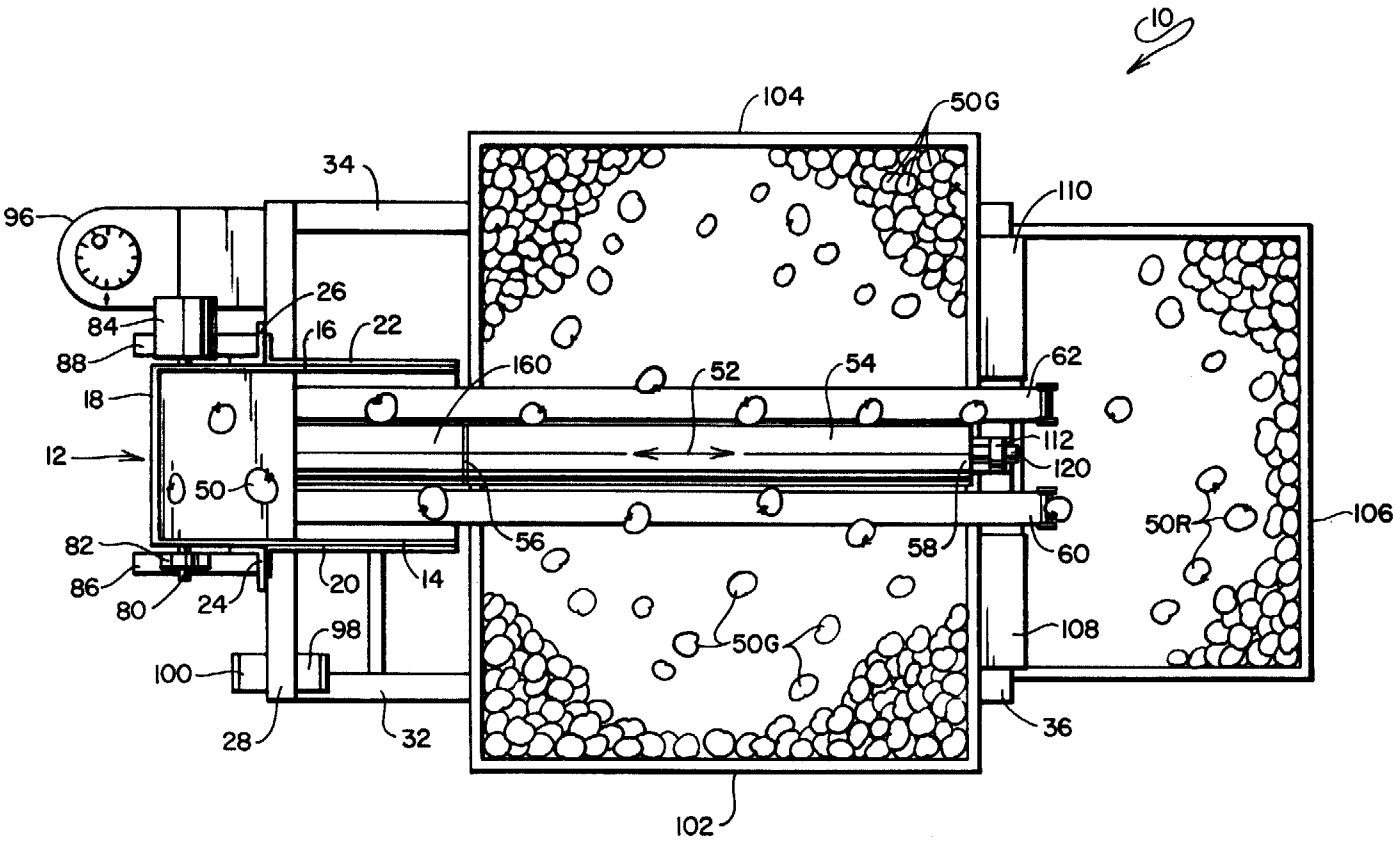
FIG. 2 is a top view of the apparatus of FIG. 1.
Figure 3:
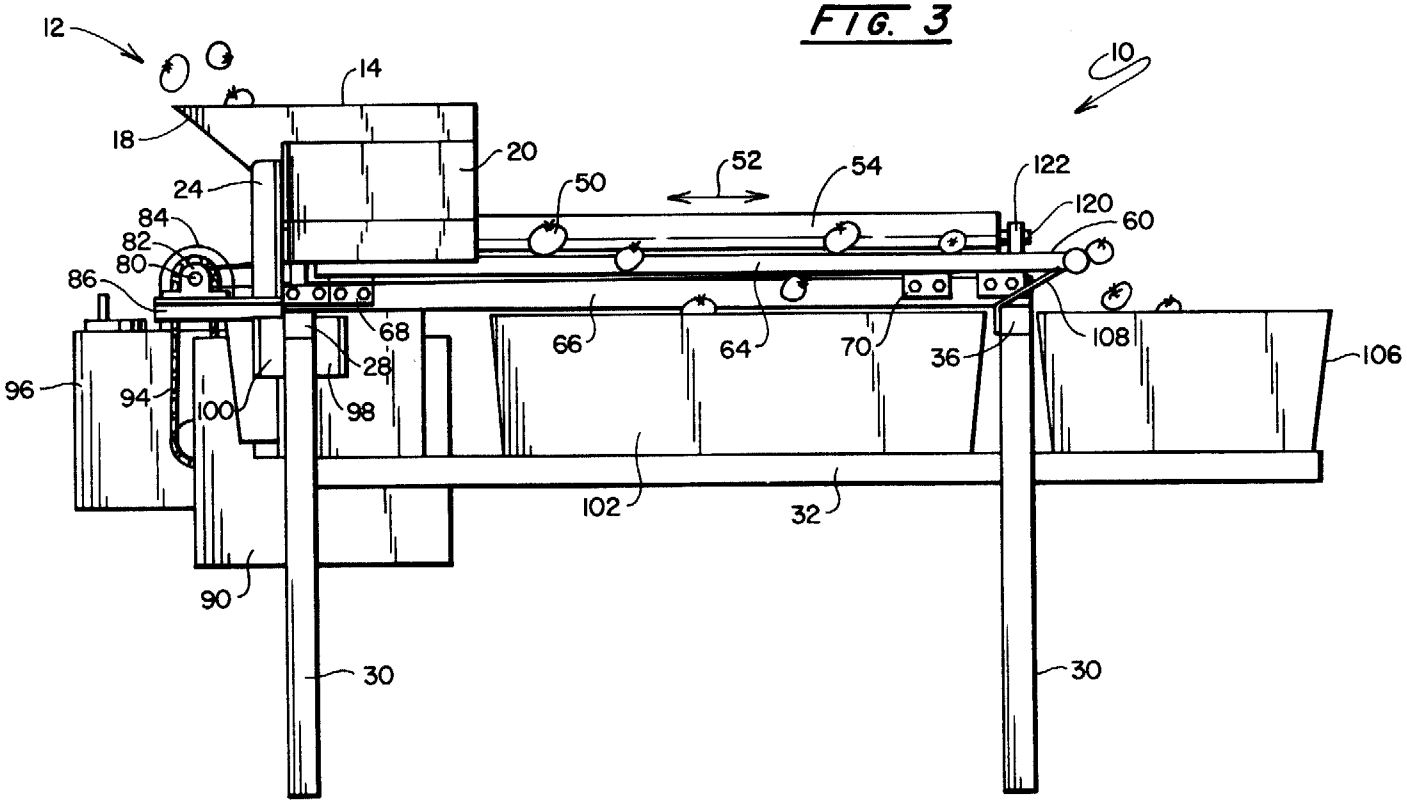
FIG. 3 is a side elevational view of the apparatus of FIG. 1.

Entrance hopper assembly 12 is positioned to introduce bulk quantities of tomatoes or objects exhibiting identifiable dynamic response to vibrational phenomena to the entrance location of a somewhat elongate sorting zone, represented generally at 52, which includes an oscillatory surface 54 supported between entrance and exit termini located respectively at 56 and 58. A transporter arrangement additionally is positioned within this zone and includes two conveyor belts 60 and 62 which extend in somewhat parallel relationship with the cylindrical oscillatory surface 54 as well as in adjacency thereto. In effect, these conveyor belts 60 and 62 are aligned in parallel with the longitudinal axis 52 of the sorting zone. Support for the upwardly disposed surfaces of conveyor belts 60 and 62 is provided by elongate metal members or channels, one of which is shown at 64 in FIGS. 1 and 3. These members are disposed within the loops of the belts and attached to a centrally disposed supporting component 66 by brackets as at 68 and 70 (FIG. 3). Brackets 68 and 70 additionally support for rotation end spindles 72 and 74 over which respective belts 60 and 62 pass at the exit portion of the sorting zone. The support of the belts by members as at 64 and spindles 72 and 74 is provided in angularly disposed fashion such that the upward surfaces of belts 60 and 62 cant toward oscillatory surface 54 at an angle which is adjustable and selected for example as about 20°. The opposite ends of belt 60 and 62 extend over rearwardly disposed drive spindles shown respectively at 76 and 78 (FIG. 4). Spindles 76 and 78, in turn, are journaled over and fixed to a drive shaft or axle 80 which, in turn, is rotatably supported at one side of the apparatus by a bearing containing bracket 82 and at the opposite side thereof by the output of a gear reduction assembly 84 (FIGS. 2–4). Bracket 82 is supported upon a horizontally disposed member 86 formed of angle stock which is fixed to upstanding support 24, while drive assembly 84 similarly is supported by a horizontal angle stock member 88 extending to upstanding support 26. Drive input to gear reduction assembly 84 is provided an electric motor drive contained within a housing 90 and having one output (FIG. 4) present as a drive shaft 92 extending to a chain and sprocket assembly 94 which, in turn, is coupled to reduction assembly 84. While electric motor drives are described in the instant embodiment, it should be understood that other power sources as hydraulic motors and the like alternately may be used for actuating the apparatus. Additional apparatus associated with the motor drive at 90 includes an AC speed control unit, as at 96, for providing operator flexibility in selecting oscillatory frequencies for the device as well as conventional start and stop components which may be housed in electrical receptacles, certain of which are revealed at 98 and 100.

Sorting apparatus 10 further includes a series of receptacles for collecting or receiving tomatoes or the like which are sorted in consequence of their transportation and coding treatment within elongate zone 52. Two of these receptacles, as at 102 and 104 are shown positioned next to and transversely along elongate zone 52, while a third, at 106, is positioned at the exit end thereof, directly beneath the end spindles 72 and 74 of respective conveyor belts 60 and 62. Additionally positioned at this end of the apparatus are angularly oriented deflecting plates 108 and 110.

Oscillatory surface 54 fashioned, for example, from steel, is formed having an elongate cylindrical configuration through which a somewhat centrally disposed drive shaft 120 extends. Drive shaft 120, in effect, extends concentrically along the longitudinal axis of zone 52 and, as revealed in FIG. 6B, is supported in the vicinity of the exit terminus 58 of the zone by a support assembly 122 which retains a bearing 124 through which the shaft extends for free rotation. Support assembly 122, in turn, is fixed to and extends upwardly from supporting component 66 extending between transverse supports 28 and 36. Note in FIG. 6B, that that portion of shaft 120 extending through bearing 124 is necked down, at 126, that portion extending through cylindrically shaped oscillatory surface 54 being of greater diametric extent.

Figure 6A:
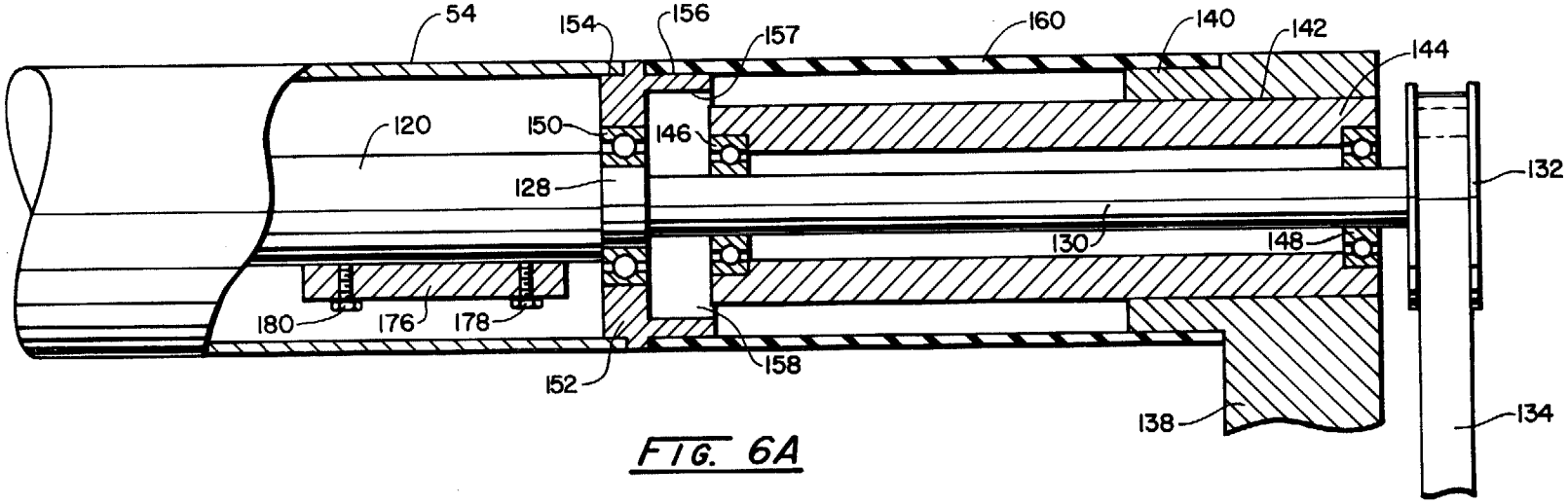
FIG. 6A is a partial sectional view of the drive and oscillatory arrangement of the apparatus of FIG. 1 at one terminus thereof.
Figure 6B:
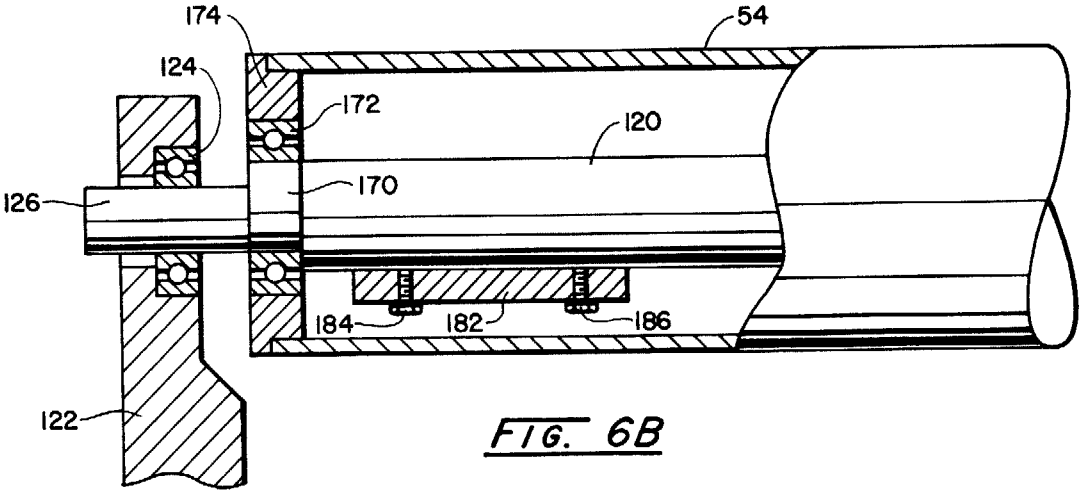
FIG. 6B is a partial sectional view of an opposite terminus of the drive and oscillatory surface arrangement of the apparatus of FIG. 1.

Support for shaft 120 at the input region of apparatus 10 is revealed in detail in FIG. 6A. Referring to that figure, it may be observed that shaft 120 again is necked down at 128 to provide a first bearing surface or journal as well as at 130 where the end portion thereof is fixed to a drive pulley 132 arranged in driven relationship with a v-belt 134. This belt normally is protected by a cowling 136 which is revealed in FIG. 4. As is apparent, v-belt 134 extends into and is driven from the motor within assembly 90 and the speed of such drive may be regulated from control 96 by the operator. Necked down portion 130 of shaft 120 is supported at the input terminus of zone 52 by a support assembly 138 which, in turn, is coupled to the supporting frame of apparatus 10 along centrally disposed horizontal supporting component 66. The upward portion of assembly 138 is machined or suitably formed at 140 to provide an annular or cylindrically shaped male bushing-like component. Additionally, this upward portion is bored at 142 coaxially with the elongate axis of zone 52. Bore 142 receives one end of a cylindrical bearing support member 144 which is inserted and fixed therewithin. Member 144 extends outwardly from support 138 in cantilever-type fashion and is counterbored at each end thereof to receive the outer races of bearings 146 and 148.

Mounted over bearing surface or journal 128 is another bearing 150 within which surface 128 is permitted to rotate. Bearing 150, in turn, is positioned within a bushing-like annular support component 152 which is formed having two oppositely disposed flange-like portions 154 and 156 of outer diameter equal to that of cylindrical portion 140 of support 138. Additionally, component 152 is formed having an internally disposed annular recess 158 which is dimensioned having a diameter such that its inward periphery 157 is spaced from the correspondingly outwardly disposed circumference of cylindrical support member 144.

A cylindrically shaped flexible restraining member 160 is positioned between portion 140 of support 138 and the flange portion 156 of component 152. In this regard, member 160 is journaled over and fixed to the annular portion 140 of component 138 and journaled over and fixed to the corresponding outer surface of annular portion 156 of component 152. As such, member 160 restrains surface 54 from rotation about the longitudinal axis of the sorting zone, while exhibiting sufficient flexure to permit an oscillatory movement. It may be observed that this permissive oscillatory movement also is achieved through the cantilever-like positioning of bearing 146 within cylindrical support member 144.

Returning to the mounting arrangement of the opposite side of surface 54 as revealed in FIG. 6B, it may be noted that shaft 120 is configured having an eccentric bearing surface or journal 170 adjacent the necked down portion thereof at 126. Journaled for rotation about cylindrical surface 170 is a bearing 172, the outer race of which is fixed within an annular bushing-like supporting component 174. Component 174 is formed having an outer flange portion of equal diameter with cylindrical oscillatory surface 54 and an adjacent portion arranged to fit within and support surface 54 from the inwardly disposed cylindrical surface thereof. Looking additionally to FIG. 5, a partial sectional view of this arrangement is revealed. Note that the bearing surface 170 is eccentric with respect to the axis of necked down portion 126 of shaft 120 and is freely rotatable within bearing 172.

Returning to FIGS. 1, 6A and 6B, it will be apparent that as rotative drive input is asserted from belt 134 into pulley 132, shaft 120 will rotate at a predetermined rate and that surface 54 will oscillate, by virtue of its connection with supporting component 174, in a manner wherein any point thereon will define a locus of circular movement having a radius corresponding with the extent of eccentricity of bearing surface 170 with respect to the axis of shaft 120. To achieve a dynamically balanced performance for the apparatus, counterweights are selectively positioned upon shaft 120 within the confines of cylindrical surface 54. Note in this regard in FIG. 6A, that a block-like counter weight 176 is fixed by machine screws 178 and 180 to shaft 120 in the vicinity of bearing 150. Additionally as revealed in FIG. 6B, a counterweight 182 is connected to shaft 120 within the confines of surface 54 by machine screws as at 184 and 186.

It may be observed from the arrangement thus shown, that the form of oscillation of surface 54 achieved with the rotation of shaft 120 is one wherein the value of amplitude of oscillation progressively increases or varies from the input terminus of the sorting zone in the region of bearing surface 128 to a maximum value in the vicinity of eccentric bearing surface 170. Such an arrangement is carried out by providing bearing surface 128 in axial alignment with the axis of shaft 120. Particularly with respect to the sorting of tomatoes by maturity classification, such an arrangement has been found to be a preferred one. However, oscillation at the position of bearing surface 128 can be effected by forming that surface eccentrically to the axis of shaft 120 in fashion similar to the arrangement at bearing surface 170.

Returning, to FIGS. 2 and 3, the operation of sorting apparatus 10 is readily revealed. In operation, bulk quantities of tomatoes with varying maturity certain of which are identified by the numeral 50, are deposited within entrance hopper assembly 12, whereupon by virtue of the slope of back wall 18, the confinement of side walls 14 and 16 as well as the angular shape of the lower portions of brackets 20 and 22, they are directed to either of conveyer belts 60 or 62. Additionally, aligning the tomatoes in single file sequential fashion upon this transporter is the cylindrical shape of the outer surface of flexible restraining member 160. Conveyer belts 60 and 62, being driven from reduction gear assembly 88, move the tomatoes in a manner wherein the contact thereof with oscillatory surface 52 is promoted. Recall in this regard, that the upper surfaces of the conveyer belts are canted inwardly to an extent permitting a coding retention of them for a suitable interval. For the embodiment shown, their slope is not particularly critical. By virtue of their dynamic response characteristics, those tomatoes which may be designated as green and identified as 50G are rejected into receptacles 102 and 104, while the red ones are transported through the sorting zone to fall into receptacle 106 and are identified by the numeral, 50R. As noted above, the operator of the apparatus can adjust for frequency of vibration by controlling motor speed 96. By selecting the oscillatory parameters of frequency and amplitude, a highly selective form of sorting can be achieved with the apparatus, a feature which will become more apparent as the description further unfolds.

Figure 10:
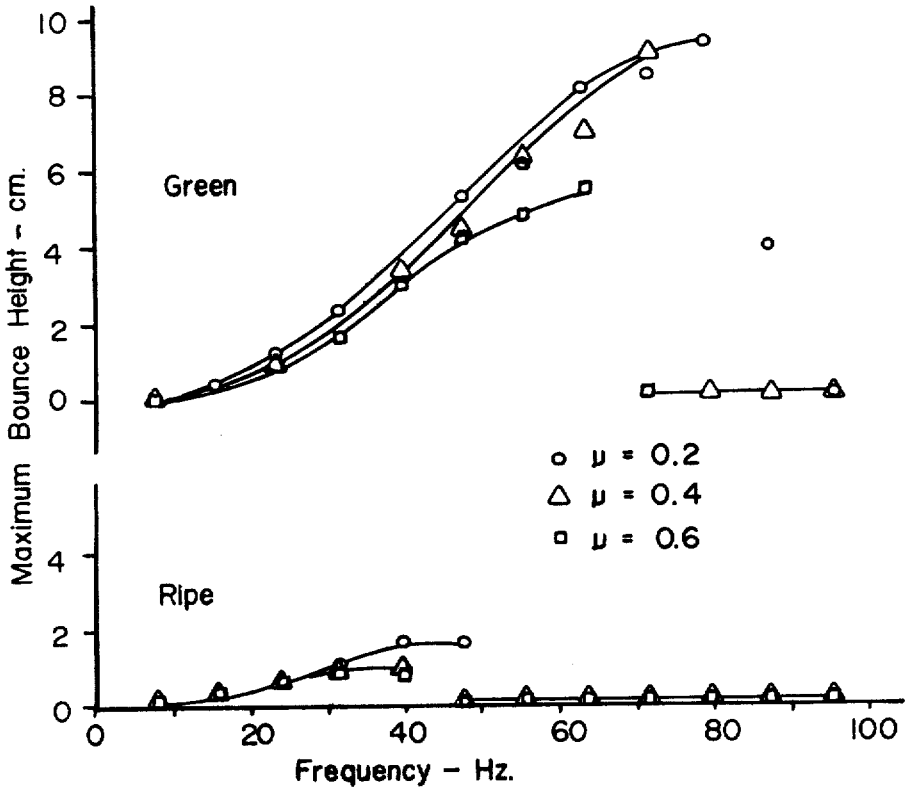
FIG. 10 is graph showing the relationship of frequency of oscillation of a vibratory surface with respect to the maximum bounce height of ripe and green tomatoes.

Looking to FIG. 7, a schematic portrayal of an experimental sorting apparatus is revealed generally at 190. Apparatus 190 includes an inclined platform 192 arranged in juxtaposition and normal to a vibratory surface 194 driven, as represented by element 196, by an electrodynamic vibrator, the frequency and amplitude output which can be varied to suit the investigator. Tomatoes of different maturities, were positioned upon the apparatus as shown at 198 and the effects of variations in amplitude and frequency noted with respect to other parameters. In this regard, looking to FIG. 10, a family of curves for green and ripe designated tomatoes are revealed which were derived in a manner wherein values for coefficient of friction, $\mu$, were adjusted for surface 192. The curves show the relationship of bounce height in centimeters with the frequency of vibration of surface 194 and reveal that alteration of the coefficient of friction does not materially affect sorting performance in a vibrational type device. This immunity is desirable, inasmuch as the coefficient may alter due to variations in transporter surface wetness as well as texture as a consequence of the relatively dirty environmental field conditions normally encountered in the operation of such apparatus.

Figure 11:
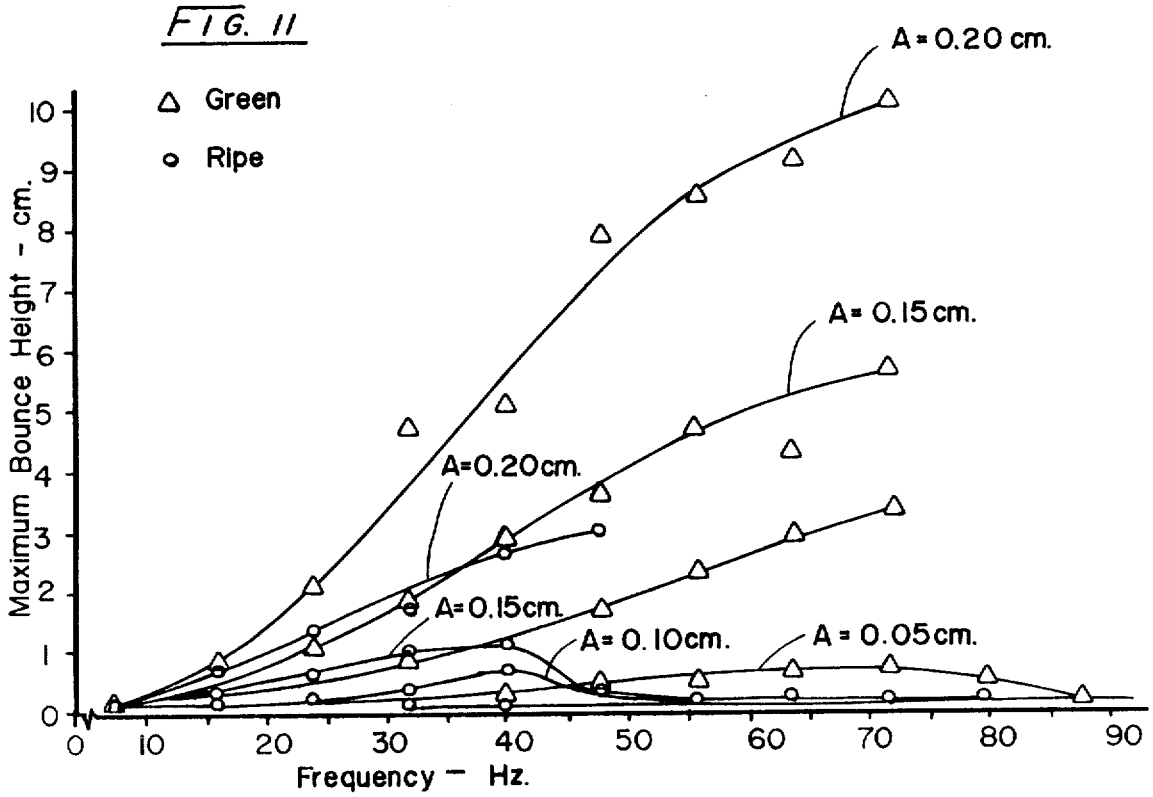
FIG. 11 is a graph showing the relationship of frequency to maximum bounce height for green and ripe tomatoes for different amplitudes of vibration.

FIG. 11 reveals a family of curves generated with apparatus as at 190 for groupings of green and ripe designated tomatoes wherein various amplitudes of vibration are utilized in conjunction with corresponding variations in frequency. These curves reveal that differential responses can be achieved by predetermined selection of optimum values of amplitude as well as fequency.

Figure 12:
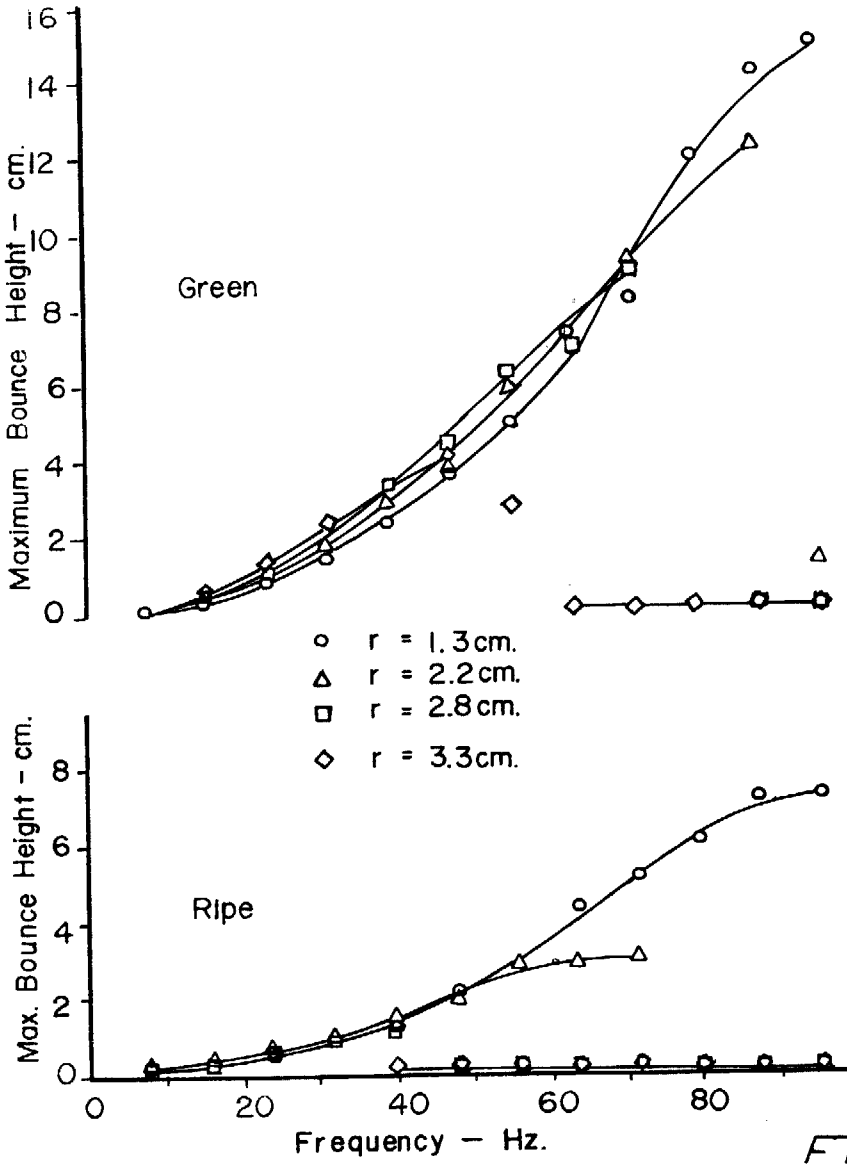
FIG. 12 is a chart showing maximum bounce height with respect to frequency for green and ripe tomatoes of four designated diameters.

FIG. 12 reveals families of curves for green and ripe designated tomatoes wherein maximum bounce height, i.e. reaction to the vibrational affects of surface 194, is compared for varying tomato radii. The curves indicated that a relative immunity with respect to such size may be recognized in the operation of vibrational sorting systems. The structure, geometry and drive system of the experimental arrangement of FIG. 7 does present certain drawbacks. For example, the angle of inclination of platform 192 becomes important for the operation of the apparatus. Additionally, the use of the noted vibrational drive at 196 has been found to require mechanisms the operation of which is both expensive and impractical.

Figure 13:
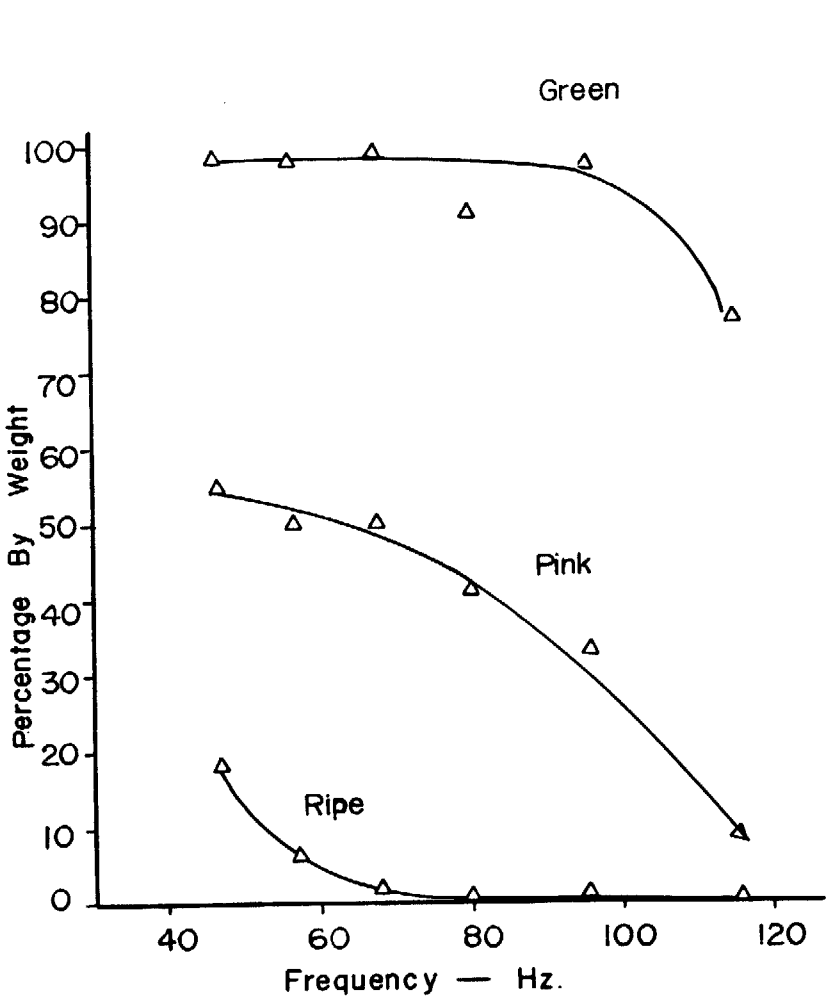
FIG. 13 is a chart showing percentage rejection of tomatoes with respect to frequency of the oscillatory surface of the apparatus of FIG. 1.

FIG. 13 represents a family of curves for three general maturity classes of tomatoes ripe, pink and green as are generated with the apparatus of FIGS. 1–6. The curves show the percentage by weight of a bulk quantity of green, pink and ripe designated tomatoes which are ejected transversely of the apparatus or switched from the coding zone. The starting bulk quantity for the test contained, by weight, about 24% green tomatoes, about 7% pink tomatoes, and about 69% ripe designated tomatoes. As is apparent from the curves, a frequency can be selected wherein substantially 100% of the ripe tomatoes are transported by conveyers 60 and 62 into the appropriate receptacle therefore at 106, while substantially 100% of the green tomatoes can be rejected into receptacles 102 and 104. The curves further reveal that a considerable control over tomatoes of intermediately designated maturities, i.e. pink, can be achieved by operator control over the selected frequency of oscillation of surface 52. By appropriately selecting the parameters of amplitude and frequency, thereof, a highly reliable sorting system and method is recognized.

The system and apparatus of the instant invention derives considerable advantage over the experimental structure shown in FIG. 7. For example, the inclination of conveyers 60 and 62 can be selected over a wide range of values without affecting the quality of sorting performance. Additionally, the relative width of these conveyer belts can be selected within a wide range of values dependent upon the diameter of the commodity to provide sorting performance (about 2 inches is selected for tomatoes). The narrowest operable belt is desired. Of particular importance, the apparatus has been found to be substantially immune from otherwise debilitating effects occasioned by dirt and the like encountered in typical field installations. Sorting efficiency additionally is improved with the arrangement, the oscillatory surface 52 being found to have little or no effect upon the relatively delicate surface skins of the tomato. A further aspect of the device found advantageous resides in the relatively long coding interval derived through the use of an elongate sorting zone. During their transportation through this zone by conveyer belts 60 and 62, the tomatoes tend to turn slightly, thereby subjecting their surfaces to a more extensive sampling type engagement with the oscillatory surface. Accordingly, a more reliable association between each tomato and the coding surface 52 is recognized. Due to the dynamic balance of the system and its relatively simple construction, a reliable and practical system for sorting is presented.

Looking to FIG. 8, an alternate embodiment for the oscillatory mechanism of sorting apparatus according to the invention is schematically revealed. In the figure, conveyers substantially similar to those described in connection with FIGS. 1–6 are provided in substantially similar fashion as at 200 and 202. Tomatoes as at 204 and 206 are transported in sequential fashion by respective conveyers 200 and 202 in the same manner as in the earlier, preferred embodiment. The oscillatory surface drive arrangement, however is provided by a single cylindrical shaft 208 the input end of which is mounted for driven rotation about its centrally disposed longitudinal axis, as is depicted at 210. The output end of shaft 208 is mounted eccentrically, for instance about the offset axis represented at 212. As a consequence, an eccentric and rotary motion is imparted to shaft 208 upon a driven rotation thereof. As in the earlier embodiment, the value of amplitude varies to a maximum value at the axis terminus of the shaft. To achieve dynamic balance, bores as at 214 are formed longitudinally within shaft 208 in correspondence with the degree of eccentricity of the mounting thereof. Without more, the shaft 208 will have a tendency to engage the outer peripheries or skins of tomatoes 204 and 206 and spin them off of the device notwithstanding the class of their maturity. To accommodate for this phenomenon, a flexible membrane 216 is suspended over shaft 208 from an elongate support 218. Appropriate orientation of the membrane is achieved by attaching elongate weights as at 220 and 222 to the downwardly depending sides thereof. The resultant arrangement eliminates the phenomena of spin-off and the like otherwise encountered and provides a reliable form of sorting. Membrane 216 may be formed, for example, of teflon or suitable flexible material and, preferably, is of a relatively thin dimension, for instance about 0.004 inch. Substantially heavier thicknesses for the membrane have been found to hinder the performance of the apparatus.

Figure 9:
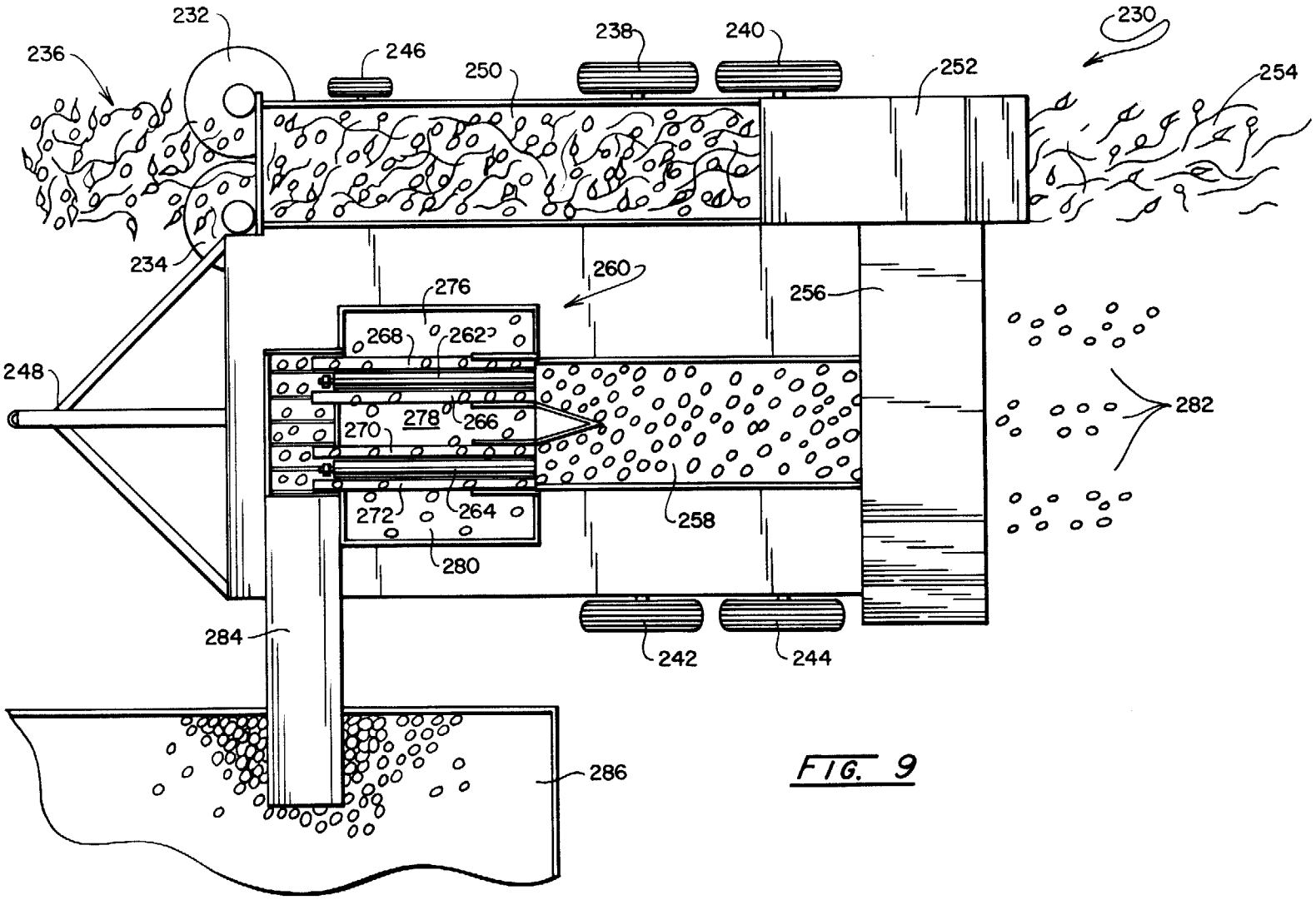
FIG. 9 is a top view of a tomato harvesting device incorporating the system and apparatus of the invention.

Turning now to FIG. 9, an adaptation of the sorting apparatus as shown generally at 10 to a "once-over" type tomato field harvester 230 is shown. Harvester 230 is formed in conventional fashion, including two annular tomato vine uprooting implements 232 and 234 which are suspended from a frame structure in an orientation to confront a row of tomato laden vines 236. The harvester incorporates a steel frame structure which is supported by rearwardly disposed wheels 238, 240 and 242. One forwardly disposed smaller wheel is revealed at 246. The entire assembly 230 is drawn from a conventional yoke arrangement 248 by a farm tractor or the like. Upon being severed, vines 236 are drawn by a flight conveyer 250 to a segregating mechanism at 252 wherein the vine components thereof are vibrationally separated from the tomatoes and expelled as waste as at 254. Bulk quantities of the discrete tomatoes then are transported by a belt or similar conveyer within compartment 256 and deposited upon one end of an endless belt 258 for delivery into a sorting arrangement fashioned according to the invention and shown generally at 260. Incorporating sorting zones having the same general sorting zone structure shown in connection with FIGS. 1–6, arrangement 260 includes two cylindrically shaped oscillatory surfaces 262 and 264. These surfaces are mounted for oscillation in the manner described in connection with the above figures and each, respectively, incorporates adjacent and endless conveyer belt components as at 266 and 268 in conjunction with oscillatory surface 262 and as at 270 and 272 in conjunction with oscillatory surface 264. In the arrangement shown, the hopper assembly 12 is deleted, the tomatoes being moved by endless belt 258 into the entrance region of each of the oscillatory surfaces and being separated into two distinct flow patterns by a wedge shaped plow 274 extending outwardly over belt 258. The sorting stage 260 separates only green tomatoes from other designated classes and these green tomatoes are disposed of by deposition through opening 276, 278 and 280 formed within the frame of harvester 230. The tomatoes thus rejected by the sorting system are deposited on the ground, as represented at 282. The ripe designated tomatoes transported through sorting zone 260 are deposited upon a flight conveyer 284, whereupon they are transported to a field conveyance device 286 which may be present as a truck or trailer bed.

Generally, harvester 230 will include, for example, one operator who stands astride belt 258 and adjusts the frequency of oscillation of oscillatory surfaces 262 and 264 to assure a statistically appropriate segregation of green designated tomatoes from the remainder. This adjustment is readily carried out by simply varying the drive rate imparted to the elongate shafts within oscillatory surfaces 262 and 264. As is apparent, the larger number of laborers normally required to sort green tomatoes from the remainder, as they stand along endless belts as at 258, is eliminated with the instant invention. Further, the sorting system of the invention can be provided at a capital investment commensurate with smaller and lower cost harvesting machines suited for smaller tomato growing installations. As is apparent, particularly in view of the discourse to follow, overripe designated tomatoes also may be sorted from those tomatoes transported through the sorting stages at 260. In this regard, the tomatoes otherwise entering conveyer 284 would be transported through an additional sorting stage, the oscillatory surface or surfaces of which are arranged to eject pink, soft ripe and firm ripe designated maturity classes, while transporting overripe designated classes through the associated sorting zone for disposal upon the harvesting field. Conveyer 284 would convey the collected ejected maturity classes to truck bed 286.

Turning now to FIG. 14, an in-plant system for sorting as many as five maturity classes of tomatoes is revealed. Assuming the bulk quantity of harvested tomatoes received at such a facility includes the maturity classes: green, pink, firm ripe, soft ripe and overripe designated tomatoes, as revealed at block 300, the system initially subjects the tomatoes to a cleaning and/or size grading procedure, as represented at block 302. While size grading may be optional, depending upon the extremes of sizes of tomatoes encountered, very often the step of cleaning is inherently carried out by the use of water flume transporting devices when the tomatoes are conveyed from trucks and the like into the plant itself. However, assuming that the bulk quantity of tomatoes is appropriately cleaned and of adequate size uniformity, they are introduced, as indicated by line 304, to a first vibrational sorting stage, represented by block 306. At this stage, which may be configured in the same manner as the sorter apparatus 10 of FIGS. 1-6, the tomatoes are subjected to a coding and switching procedure within a sorting zone, the oscillation of the contacting surface of which is selected as having a frequency between about 60 and 100 Hertz and a maximum value of amplitude of about 0.20 inch. It may be recalled that the amplitude may be varied in value from zero up to the maximum level, as about 0.20 inch. Sorting stage 306 serves to transversely eject green designated tomatoes, as represented by line 308. These tomatoes are transported to a disposal function 310 from which a small quantity thereof may be directed to subsequent stations for use in developing by-products, as represented by line 312 and block 314. Such uses will include, for example, the manufacture of relishes and the like. The remaining green designated tomatoes are removed as waste and transported, as along line 316, to a biodegradation procedure, for instance composting, as revealed at block 318.

Those tomatoes transported through and from the first vibrational sorting stage will include overripe, soft ripe, firm ripe and pink designated tomatoes. This grouping of tomato maturity classes is transported, as indicated by line 320, to a second vibrational sorting stage whereupon they are passed through a sorting zone for contact with a coding and switching surface oscillating at a frequency selected between about 20 and 30 Hertz and at a maximum amplitude selected as about 0.38 inch. This sorting procedure will effect a passing through the sorting zone of overripe designated tomatoes which are transported, as represented by line 324 to biodegradation stage 318.

The second vibrational sorting stage dynamically ejects pink, firm ripe and soft ripe designated tomatoes, as represented by line 326. These class groupings are suitable, without more, for use, for example, in the production of juice and paste type products. Accordingly, at the option of the operator and as represented by dashed line 328, the noted classes may be directed into a juice and paste processing function 330.

Alternately, however, the three maturity classes of tomatoes may be directed along the noted line 326 to a third vibrational sorting stage, represented at block 332. As the tomatoes are transported through the sorting zone of this stage, they are contacted with a surface oscillating at a frequency selected from between about 50 and 60 Hertz and at a maximum amplitude selected as about 0.20 inches. In consequence of this sorting procedure, pink designated tomatoes are ejected from this stage as represented at line 334, for use in the juice and paste processing procedures. Transported through the sorting zone of the third vibrational stage, however, are firm ripe and soft ripe designated tomatoes which are conveyed as indicated by line 336 to the input of a fourth vibrational sorting stage, represented by block 338. As these two maturity classes of tomatoes pass through the sorting zone of the fourth vibrational sorting stage, they are contacted with a surface oscillating at a frequency selected between about 40 and 50 Hertz and at a maximum amplitude selected as about 0.30 inch. In consequence, the firm ripe designated tomatoes are ejected from the noted zone, as represented by line 340 and are conveyed to a whole pack processing station, as represented at line 342. As indicated hereinabove, it is necessary that only firm ripe tomatoes be utilized for this particular form of processing. Softer tomatoes tend to biologically break down following canning, while tomatoes containing any regions of green coloration thereon generally are found undesirable by the typical consumer. The fourth vibrational sorting stage also transports soft ripe designated tomatoes therethrough which, as represented by line 344, are conveyed to the juice and paste processing function represented by block 330.

It should be understood that, in the course of operating the system of the invention, operator adjustments over the frequency of oscillation of coding surfaces within each of the sorting zones can be provided to "fine tune" the system for optimum performance. Further, as is apparent, the system finds use over a multitude of comestibles, for instance bloated pickles, oranges which may have been subjected to freezing conditions, potatoes evidencing possible internally disposed voids for use in chip manufacture, relatively soft fruits, such as pears and the like, and many additional products.

Since certain changes may be made in the system, method and apparatus without departing from the scope of the invention herein involved, it is intended that all matter contained in the above description or shown in the accompanying drawings shall be interpreted as illustrative and not in a limiting sense.

What is claimed is:

1. Sorting apparatus for objects exhibiting identifiable dynamic response to vibrational phenomena comprising:

means for introducing a quantity of said objects at the entrance location of a sorting zone extending along a given longitudinal axis;

means defining an oscillatory surface within said zone and extending along said longitudinal axis;

drive means including a dynamically balanced rotative drive member actuable to impart oscillation of predetermined frequency and amplitude characteristics to said oscillatory surface;

transporter means including a conveyer surface within said zone extending from said entrance location in parallel relationship with said longitudinal axis and adjacent said oscillatory surface for sequentially moving said objects within said zone in orientations promoting the kinetic reaction thereof with said oscillatory surface;

means adjacent said zone for receiving reacted said objects exhibiting predetermined dynamic response characteristics to said kinetic reaction; and means for simultaneously actuating said drive means and said transporter means.

2. The sorting apparatus of claim [1] *42* in which said [drive] *oscillating* means [rotative drive member] is configured to impart [a said] *an* oscillation of varying amplitude commencing from a lowest value in the vicinity of [said] *an* entrance location [of said sorting zone] and progressively increasing outwardly therefrom.

3. The sorting apparatus of claim [1] *42* in which [said drive means] *the* frequency *of the oscillating means* is selected from between about 20 and 100 Hertz and said amplitude is selected between about 0.0 and 0.4 inch.

4. The sorting apparatus of claim [1] *42* in which:

said [transporter means] *conveyer surface* comprises two said conveyer surfaces provided by corresponding endless belts oppositely disposed along said longitudinal axis and supported to slope inwardly toward said oscillatory surface; and

[said] *said apparatus comprises* receiving means [includes] *for the objects to be sorted including* first receiver means positioned to receive said objects removed from the vicinity of said oscillatory surface by said two conveyer surfaces, and second receiver means situate adjacent the outwardly disposed peripheries of said two conveyer surfaces.

5. The sorting apparatus of claim 4 in which each said conveyer surface is supported to derive a said slope of about 20° with respect to horizontal.

6. The sorting apparatus of claim 4 [in which said] *including* introducing means [is] configured with respect to said [drive] *oscillating* means to effect a simultaneous, sequential, single-file introduction of said objects to said two conveyer surfaces.

7. The sorting apparatus of claim [1] *42* in which:

(a) said [drive] *oscillating* means comprises:

a [said] drive member present as an elongate shaft extending along said longitudinal axis from a first terminus in the vicinity of [said] *an* entrance location to a second terminus;

bearing means for supporting said shaft at least in the vicinity of said first and second termini for symmetrical rotation about said longitudinal axis;

means defining a bearing surface situate upon said shaft intermediate said first and second termini, moveable in driven relationship with said shaft and having an axis of rotation eccentric with respect to said longitudinal axis; and (b) said [means defining an] oscillatory surface comprises a supporting component arranged in driven relationship with said bearing surface and fixed to said oscillatory surface so as to convey an oscillatory motion thereto when said shaft is rotated.

8. The sorting apparatus of claim 7 in which said [drive] *oscillating* means includes a counterweight associated with said shaft at a location selected to derive [said] *a* dynamic balance.

9. The sorting apparatus of claim 7 in which said [means defining an] oscillatory surface includes flexible restraining means fixed against rotation with respect to said bearing surface and fixed to said oscillatory surface for restraining the rotation of said surface about said eccentric axis of rotation while permitting the oscillatory movement thereof upon the rotation of said shaft.

10. The sorting apparatus of claim 7 in which said means defining a bearing surface is positioned upon said shaft in the vicinity of said second terminus.

11. The sorting apparatus of claim [1] *42* in which:

(a) said [drive] *oscillating* means comprises:

a [said] drive member present as an elongate shaft extending along said longitudinal axis from a first terminus in the vicinity of [said] *an* entrance location [of said zone] to a second terminus in the vicinity of an end of said [zone opposite said entrance location] *oscillatory surface;* first and second bearing means situate respectively in the vicinity of said first and second termini for supporting said shaft for rotation about said longitudinal axis;

a first bearing surface situate upon said shaft in the vicinity of said first terminus;

a second bearing surface situate upon said shaft in the vicinity of said second terminus and having a circular profile the central axis of which is eccentric with respect to said longitudinal axis; and (b) said [means defining an] oscillatory surface comprises:

first support means fixed to said oscillatory surface and rotatable upon said first bearing surface;

second support means fixed to said oscillatory surface and rotatable upon said second bearing surface;

restraining means associated with said first support means and oscillatory surface for restraining said surface against rotation about said central axis while permitting the oscillation thereof with respect to said longitudinal axis.

12. The sorting apparatus of claim 11 including means associated with said shaft for effecting the dynamic balance thereof.

13. The sorting apparatus of claim 11 in which the said eccentricity of said second bearing surface central axis is selected as about 0.20 inch.

14. The sorting apparatus of claim 11 in which said first bearing surface is of circular profile, the central axis of said profile being coaxial with said longitudinal axis.

15. The sorting apparatus of claim 11 in which:

said [transporter means] *conveyer surface* comprises two [said] conveyer surfaces provided by corresponding endless belts oppositely disposed along said longitudinal axis and supported to slope inwardly toward said [oscillating] *oscillatory* surface; and

[said] *said apparatus comprises* receiving means [includes] *for the objects to be sorted including* first receiver means positioned to receive said objects removed from the vicinity of said oscillatory surface by said two conveyer surfaces, and second receiver means situate adjacent the outwardly disposed peripheries of said two conveyer surfaces.

16. The sorting apparatus of claim [1] *42* in which:

(a) said [drive] *oscillating* means [rotative drive member] extends substantially between a first terminus in the vicinity of *an* entrance location [of said zone] and a second terminus in the vicinity of an end of said [zone opposite said entrance location] *oscillatory surface* and is mounted for eccentric rotation about said longitudinal axis; and (b) [said means defining said oscillatory surface comprises a thin, flexible, sheet-like member positioned in mutually contacting adjacency over said rotative member, fixed against rotation therewith and oscillatory in response to the rotative actuation thereof] *a thin flexible, sheet-like member fixed against rotation is provided enclosing said oscillatory surface.*

17. The sorting apparatus of claim 16 in which said [means definind said] oscillatory surface includes weight means connected with said sheet-like member for [urging said member into said mutually contacting adjacency] *holding said member in proper operating position.*

18. The sorting apparatus of claim [1] *42* in which said [rotative drive member] *oscillatory surface* is configured and mounted to effect a said eccentric rotation exhibiting an eccentricity which increases in extent from [said first terminus to said second terminus] *one end of said surface to the other.*

19. The sorting apparatus of claim 16 in which said sheet-like member is a polymeric membrane having a thickness of about 0.004 inch.

20. The method for sorting a quantity of discrete objects exhibiting classifiable dynamic response to vibrational phenomena comprising the steps of:

introducing a quantity of said objects to the input of a sorting zone;

transporting said objects in sequential, single file fashion upon a narrow conveyer surface moving in a given direction through said zone;

simultaneously with said transporting, promoting a kinetic reaction of said objects by contact thereof with a surface disposed along said zone and oscillating at a predetermined frequency and [at amplitudes] *so as to move any point on the oscillatory surface about a circular locus the diameter of which is equivalent to the amplitude of the oscillation, said amplitude* increasing *uniformly* in value along said zone respectively from said input to the output thereof;

receiving said objects of one class dynamically reacting to said contact by ejective movement transverse to said given direction; and receiving said objects of another class transported through said zone and exiting from said output thereof.

21. The method for sorting objects of claim 20 including the step of adjusting said frequency of oscillation of said surface to improve the accuracy of sorting of said objects between said one class and said other class.

22. The method for sorting objects of claim 20 in which said objects are comestibles and said frequency and maximum value of said amplitude are selected for establishing said one and other class with respect to a predetermined value thereof for human consumption.

23. The method for sorting objects of claim 20 in which the step for promoting a kinetic reaction by contact with said oscillating surface is gravitationally [affected] *effected* by the inclination of said conveyer surface toward said oscillating surface.

[24. The method for sorting objects of claim 20 in which the step for promoting a kinetic reaction by contact with said surface is provided by an oscillation thereof wherein any point of the surface moves about a circular locus the diameter of which is equivalent to the said amplitude of oscillation.]

25. The method for sorting objects of claim [24] *21* in which said objects are comestibles and said frequency and maximum value of said amplitude are selected for establishing said one and other class with respect to a predetermined value thereof for human consumption.

26. The method for sorting tomatoes in accordance with the degree of ripeness thereof comprising the steps of:

introducing a quantity of said tomatoes of a given cultivar to the input of a sorting zone;

transporting said tomatoes in sequential, single file fashion upon a narrow conveyer surface moving in a given direction in said zone;

simultaneously with said transporting, effecting the contact of said tomatoes to promote the kinetic reaction thereof with a surface disposed along said zone and oscillating at the frequency selected with respect to said cultivar within the range of about 0 to 100 Hertz [and], at an amplitude selected within the range of about 0 to 0.38 inch; *and so as to move any point on the oscillatory surface about a circular locus the diameter of which is equivalent to the amplitude of the oscillation* receiving tomatoes dynamically reacting to said contact by ejective movement transverse to said given direction; and receiving tomatoes which have passed through said zone.

27. The method for sorting tomatoes of claim 26 in which said step of contacting said tomatoes with an oscillating surface is carried out in a manner wherein said contact is effected at progressively enlarging amplitudes of oscillation of said surface.

28. The method for sorting tomatoes of claim 26 in which said contacting of said tomatoes with said oscillating surface is gravitationally effected by the inclination of said conveyer surface toward said oscillating surface.

[29. The method for sorting tomatoes of claim 26 in which said contact of said tomatoes with said oscillating surface is provided by an oscillation of said surface in a manner wherein any point of the surface is moved to define a circular locus of motion the diameter of which is equivalent to the said amplitude of oscillation.]

30. The method for sorting tomatoes of claim 26 including the step of adjusting said frequency of oscillation of said surface to improve the accuracy of sorting of said tomatoes.

31. A system for sorting bulk quantities of tomatoes which may contain classes thereof designated as green, pink, firm ripe, soft ripe, and overripe to effect the segregation of select classes thereof, comprising:

means for receiving said bulk quantity of tomatoes;

first vibrational sorting stage means for transporting said tomatoes from said receiving means through a first sorting zone in contacting relationship with a surface oscillating about a curvilinear locus at a frequency selected between about 60 to 100 Hertz and at a maximum amplitude selected within the range of about 0.20 to 0.25 inch to vibrationally eject green designated tomatoes from said first zone for disposal, while transporting pink, overripe, firm ripe and soft ripe designated tomatoes therethrough;

second vibrational sorting stage means for receiving said tomatoes transported through said first sorting zone and transporting said tomatoes through a second sorting zone in contacting relationship with a surface oscillating about a curvilinear locus at a frequency selected between about 25 to 30 Hertz and at a maximum amplitude selected as about 0.38 inch to vibrationally eject pink, firm ripe and soft ripe designated tomatoes therethrough; and means for receiving said ejected pink, firm ripe and soft ripe designated tomatoes.

32. The system for sorting bulk quantities of tomatoes of claim 31 wherein at least one said first and second vibrational sorting stage means includes means for selectively adjusting the said frequency of said surface oscillation to optimize sorting stage performance.

33. The system for sorting bulk quantities of tomatoes of claim 31 wherein a said vibrational sorting stage means surface is configured to oscillate such that any point thereof moves about a circular locus the diameter of which is equivalent in extent to the said amplitude of oscillation.

34. The system for sorting bulk quantities of tomatoes of claim 31 in which a said sorting stage means is configured for effecting said surface oscillation at progressively enlarging values of amplitude along an associated said sorting zone.

35. The system for sorting bulk quantities of tomatoes of claim 31 further comprising:

third vibrational sorting stage means for receiving said tomatoes transported through said second sorting zone and transporting said received tomatoes through a third sorting zone in contacting relationship with a surface oscillating about a curvilinear locus at a frequency selected between about 50 to 60 Hertz and at a maximum amplitude of about 0.20 inch to vibrationally eject pink designated tomatoes from said third zone while transporting firm ripe and soft ripe designated tomatoes therethrough;

fourth vibrational sorting stage means for receiving said tomatoes transported through said third sorting zone and transporting said received tomatoes through a fourth sorting zone in contacting relationship with a surface oscillating about a curvilinear locus at a frequency selected between about 40 to 50 Hertz and at maximum amplitude of about 0.30 inch to vibrationally eject firm ripe designated tomatoes from said fourth zone while transporting soft ripe designated tomatoes therethrough; and said receiving means includes first means for receiving said pink and soft ripe designated tomatoes and second means for receiving said firm ripe designated tomatoes.

36. The system for sorting bulk quantities of tomatoes of claim 34 wherein any point of a said vibrational sorting stage means surface is configured for oscillation defining a circular locus the diameter of which is equivalent in extent to the said amplitude of oscillation.

37. The system for sorting bulk quantities of tomatoes of claim 34 wherein at least one said first second vibrational sorting stage means includes means for selectively adjusting the said frequency of said surface oscillation to optimize sorting stage performance.

38. The system for sorting bulk quantities of tomatoes of claim 34 in which a said sorting stage means is configured for effecting said surface oscillation at progressively enlarging values of amplitude along an associated said sorting zone.

39. The system for sorting bulk quantities of tomatoes of claim 38 wherein any point of a said vibrational sorting stage means surface is configured for oscillation defining a circular locus the diameter of which equals the said amplitude of oscillation.

40. In tomato harvesting apparatus of a variety wherein means are provided for mechanically removing tomato laden vines from their field situs of growth and transported to automatic means for separating substantially all of said tomatoes from said vines and loading means for transporting said separated tomatoes to receiving means, the improvement comprising:

means for introducing said separated tomatoes to the entrance of a first sorting zone situate upon said harvesting apparatus and extending to a zone exit;

means defining an oscillatory surface within and extending along said zone;

transporter means including at least one conveyer surface within said zone extending from said entrance in substantially parallel relationship with and adjacent to said oscillatory surface for sequentially moving said tomatoes within said zone toward said exit in orientations promoting the kinetic reaction thereof with said oscillatory surface;

drive means including a dynamically balanced rotative drive member actuable to impart oscillation of frequency and amplitude characteristic to said oscillatory surface predetermined for effecting the ejection transversely from said zone of green designated tomatoes;

means adjacent said sorting zone for effecting disposed of said transversely ejected green designated tomatoes upon said field;

said loading means being configured for receiving tomatoes transported from said sorting zone exit by said transporter means.

41. The improved tomatoe harvesting apparatus of claim 40 further including:

means for receiving said tomatoes transported from said first sorting zone exit and introducing said thus received tomatoes to the entrance of a second sorting zone situate upon said harvesting apparatus and extending to a second zone exit, means defining a second oscillatory surface within and extending along said second zone;

transporter means including at least one conveyer surface within said second zone extending from said entrance thereof in substantially parallel relationship with and adjacent to said oscillatory surface for sequentially moving tomatoes within said second zone toward said exit thereof in orientations promoting the kinetic reaction thereof with said oscillatory surface;

drive means including a dynamically balanced rotative drive member actuable to impact oscillation of predetermined frequency and amplitude characteristic to said second oscillatory surface predetermined for effecting the ejection transversely from said second zone of tomatoes having a maturity designation other than overripe;

means for receiving overripe designated tomatoes transported from said second sorting zone exit by said conveyer surface extending therethrough and effecting the disposal thereof upon said field;

said loading means being configured for receiving only tomatoes ejected from said second sorting zone.

*42. Sorting apparatus including,*

*an oscillatory surface having a longitudinal axis, means for oscillating said oscillatory surface, so as to move any point on the oscillatory surface about a circular locus the diameter of which is equivalent to the amplitude of the oscillation*

*a conveyer surface extending along the oscillatory surface generally parallel to said axis and sloping downward toward the oscillatory surface, means for moving said conveyer surface in a longitudinal path generally parallel to said axis,*

*the oscillatory surface being supported on mountings and means for reducing the transmission of oscillations to said mountings.*

*43. The apparatus of claim 42 wherein said oscillating means provides oscillations not substantially greater than 100 Hertz.*

*44. The apparatus of claim 43 wherein said oscillating means provides oscillations of an amplitude not substantially greater than 0.4 inches.*

*45. The apparatus of claim 44 wherein the oscillating means comprises a dynamically balanced rotational drive member.*

*46. The apparatus of claim 42 wherein the oscillating means comprises a dynamically balanced rotational drive member.*

*47. The sorting apparatus of claim 42 wherein the means for reducing the transmission of oscillations comprises a dynamically balanced rotary drive member actuable to impart oscillations to said oscillatory surface.*

*48. The sorting apparatus according to claim 1 wherein said drive member is configured to impart oscillation of predetermined frequency and amplitude characteristics substantially uniformly to said oscillatory surface.*

*49. The sorting apparatus of claim 42 wherein the oscillatory surface is an elongated, rigid surface and wherein said means for oscillating comprises means for moving one end of said oscillatory surface through a motion different than the motion at the other end of said elongated oscillatory surface, thereby imparting oscillations of different amplitudes to said oscillatory surface at locations along said axis.*

*50. Apparatus for sorting comestibles, including:*

*(a) an elongated oscillatory surface having a longitudinal axis;*

*(b) a first drive mechanism for oscillating said oscillatory surface;*

*(c) a conveyer surface extending along the oscillatory surface generally parallel to said axis and sloping downward toward the oscillatory surface;*

*(d) a second drive mechanism for moving said conveyor surface in a longitudinal path generally parallel to said axis; and*

*(e) said first drive mechanism including means for moving one end of said oscillatory surface through a motion different than the motion at the other end of said oscillatory surface, thereby imparting oscillations of different amplitudes to said elongated oscillatory surface at locations along said axis.*

*51. The apparatus of claim 50 wherein the first drive mechanism includes means for moving any point on the oscillatory surface about a circular locus the diameter of which is equivalent to the amplitude of the oscillation.*

*52. The apparatus of claim 50 wherein the first drive mechanism comprises a dynamically balanced rotational drive member.*

*53. The apparatus of claim 50 wherein the first drive mechanism includes a rotary member which is elongated along said axis.*

* * * * *